United States Patent
Kawashima et al.

(10) Patent No.: US 8,160,868 B2
(45) Date of Patent: Apr. 17, 2012

(54) SCALABLE DECODER AND SCALABLE DECODING METHOD

(75) Inventors: Takuya Kawashima, Ishikawa (JP); Hiroyuki Ehara, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1249 days.

(21) Appl. No.: 11/908,513

(22) PCT Filed: Mar. 13, 2006

(86) PCT No.: PCT/JP2006/304902
§ 371 (c)(1),
(2), (4) Date: Sep. 13, 2007

(87) PCT Pub. No.: WO2006/098274
PCT Pub. Date: Sep. 21, 2006

(65) Prior Publication Data
US 2009/0061785 A1 Mar. 5, 2009

(30) Foreign Application Priority Data
Mar. 14, 2005 (JP) .................. 2005-071504

(51) Int. Cl.
*G10L 11/04* (2006.01)
(52) U.S. Cl. ........ 704/206; 704/500; 704/219; 704/230; 704/220; 704/205
(58) Field of Classification Search .......... 704/500–504, 704/219, 206, 205, 230, 220, 221, 222, 200.1
See application file for complete search history.

(56) References Cited

U.S. PATENT DOCUMENTS

| | | | | |
|---|---|---|---|---|
| 5,894,473 A * | 4/1999 | Dent | ............................ | 370/342 |
| 6,252,915 B1 * | 6/2001 | Mollenkopf et al. | ......... | 375/297 |
| 6,445,696 B1 * | 9/2002 | Foodeei et al. | ............... | 370/356 |
| 6,826,527 B1 | 11/2004 | Unno | | |
| 7,286,982 B2 * | 10/2007 | Gersho et al. | ................. | 704/223 |
| 7,315,815 B1 * | 1/2008 | Gersho et al. | ................. | 704/223 |
| 7,502,375 B2 * | 3/2009 | Hahn et al. | .................... | 370/401 |
| 7,610,198 B2 * | 10/2009 | Thyssen | ....................... | 704/230 |

(Continued)

FOREIGN PATENT DOCUMENTS

JP 2001-154699 6/2001

(Continued)

OTHER PUBLICATIONS

3GPP TS 26.091 V5.0.0 (Jun. 2002) Technical Specification, "3rd Generation Partnership Project; Technical Specification Group Services and System Aspects; Mandatory Speech Codec speech processing functions; Adaptive Multi-Rate (AMR) speech codec; Error concealment of lost frames" (Release 5), 2002.

*Primary Examiner* — Vijay B Chawan
(74) *Attorney, Agent, or Firm* — Greenblum & Bernstein, P.L.C.

(57) ABSTRACT

A scalable decoder capable of avoiding deterioration in subjective quality of a listener. The scalable decoder for decoding core layer encoding data and extension layer encoding data including an extension layer gain coefficient, wherein a voice analysis section detects variation in power of a core layer decoding voice signal being obtained from the core layer encoding data, a gain attenuation rate calculating section (140) sets the attenuation intensity variable depending on variation in power, and a gain attenuation section (143) attenuates the extension layer gain coefficient in a second period preceding a first period according to a set attenuation intensity when extension layer encoding data in the first period is missing, thus interpolating the extension layer gain coefficient in the first period.

16 Claims, 14 Drawing Sheets

U.S. PATENT DOCUMENTS

| | | | |
|---|---|---|---|
| 7,617,096 B2 * | 11/2009 | Thyssen | 704/219 |
| 2002/0072901 A1 * | 6/2002 | Bruhn | 704/229 |
| 2003/0078773 A1 * | 4/2003 | Thyssen | 704/230 |
| 2003/0078774 A1 * | 4/2003 | Thyssen | 704/230 |
| 2003/0083865 A1 * | 5/2003 | Thyssen | 704/205 |
| 2004/0049380 A1 | 3/2004 | Ehara et al. | |
| 2005/0154584 A1 | 7/2005 | Jelinek et al. | |
| 2005/0228651 A1 * | 10/2005 | Wang et al. | 704/207 |

FOREIGN PATENT DOCUMENTS

| | | |
|---|---|---|
| JP | 2002-236495 | 8/2002 |
| JP | 2003-241799 | 8/2003 |
| JP | 2004-526173 | 8/2004 |
| JP | 2004-348120 | 12/2004 |
| WO | 02/37475 | 5/2002 |
| WO | 03/102921 | 12/2003 |

* cited by examiner

SCALABLE DECODER AND SCALABLE DECODING METHOD

TECHNICAL FIELD

The present invention relates to a scalable decoding apparatus and a scalable decoding method for decoding layer coded signals.

BACKGROUND ART

For example, according to the technology of layered coding and decoding speech signals, if encoded data of a certain layer is lost, it is possible to decode speech signals from encoded data of another layer. This encoding technology is typically referred to as "scalable speech coding" (or "scalable speech codec"). In scalable speech coding, there is also the speech coding referred to as band scalable speech coding. In band scalable speech coding, a processing layer that performs coding and decoding for narrow band signals and a processing layer that performs coding and decoding for making narrowband signals high quality and broadband signals, are used. Hereinafter, the former processing layer will be referred to as the "core layer" and the latter processing layer will be referred to as the "enhancement layer".

Band scalable speech coding is assumed to be applied to speech data communication over a communication network where, for example, a transmission band is not ensured and thereby encoded data can be partially dropped (hereinafter, the dropped coded data refers to "loss") as a result of a loss or delay. In this case, a receiver may receive coded data of core layer and enhancement layer (core layer coded data and enhancement layer coded data), or only the core layer coded data.

A method of interpolating information lost on the channel is, for example, disclosed in non-patent document 1. The method disclosed in the document is used in speech codec employing the single layer CELP (Code Excited Linear Prediction). Further, the method performs interpolation for parameters required to synthesize speech when a loss of the speech frame occurs, based on the past information. Particularly, as for gain coefficients, the interpolated gain coefficients are calculated by monotone decrease function for the gain coefficients received successfully in the past.

Non-patent document 1: "AMR Speech Codec; Error Concealment of lost frames", 3GPP TS26.091 V5.0.0, 2002-06.

DISCLOSURE OF INVENTION

Problems to be Solved by the Invention

However, in the prior art described above, the interpolated gain is basically reduced based on only the past information during a speech frame loss period. Decoded interpolated speech is different from the original decoded speech when interpolation is prolonged, and the above provision is thereby required to prevent disagreeable sound. However, the following problem may occur when the processing is simply applied to scalable speech codec. That is, if the signal of the enhancement layer is interpolated using the above method when the signal is lost, there is a problem that the listeners may experience a disagreeable sensation or a sense of fluctuation in the signal, and subjective quality deteriorates according to changes in power of the core layer decoded speech signal and the gain attenuation in the enhancement layer decoded speech signal.

For example, when the signal of the enhancement layer is lost, the power of the core layer decoded speech signal is dramatically reduced and the gain of the enhancement layer decoded speech signal is attenuated at a extremely slow pace, the enhancement layer decoded speech deteriorated by the interpolation becomes obvious. Further, for example, when the signal of the enhancement layer is lost, the power of the core layer decoded speech signal does not change substantially and the gain of the enhancement layer decoded speech signal is dramatically attenuated, a band change is perceived.

Therefore, it is an object of the present invention to provide a scalable decoding apparatus and scalable decoding method capable of preventing deterioration of the subjective quality of the listeners.

Means for Solving the Problem

The scalable decoding apparatus of the present invention decodes core layer encoded information and enhancement layer encoded information including enhancement layer gain coefficients and employs a configuration having a change detecting section that detects a change in power of a core layer decoded signal obtained from the core layer encoded information, a setting section that variably sets a degree of attenuation according to the detected change in power, and an attenuating section that, when enhancement layer encoded information of a first interval is lost, attenuates enhancement layer gain coefficients for a second interval earlier than the first interval according to the set degree of attenuation and interpolates enhancement layer gain coefficients for the first interval.

Advantageous Effect of the Invention

According to the present invention, it is possible to avoid deterioration of the subjective quality of the listener.

BEST MODE FOR CARRYING OUT THE INVENTION

Hereinafter, embodiments of the present invention will be explained in detail with reference to the attached drawings.
(Embodiment 1)

Figure 1:
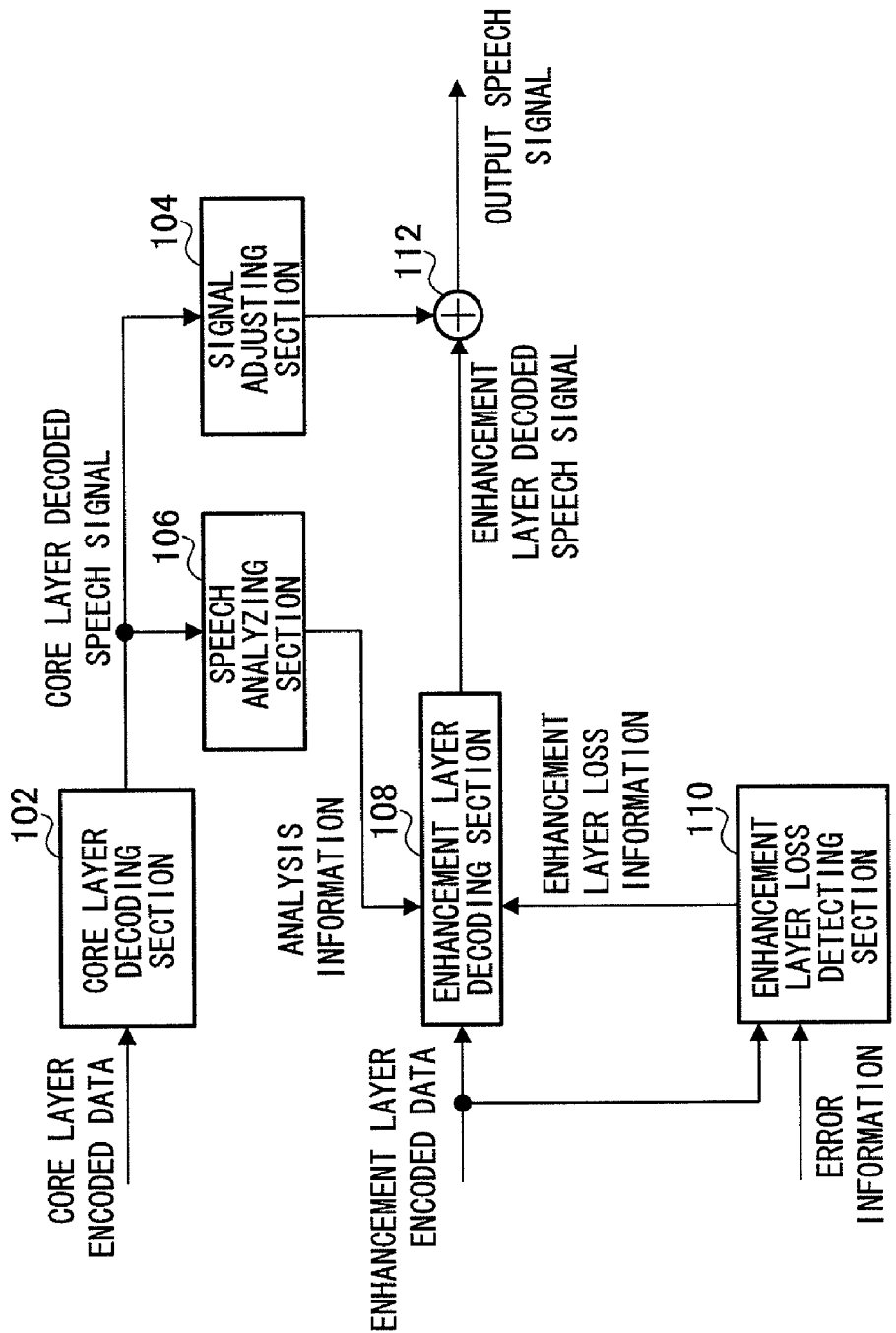
FIG. 1 is a block diagram showing the configuration of a scalable decoding apparatus according to Embodiment 1 of the present invention.

FIG. 1 is a block diagram showing the configuration of a scalable decoding apparatus according to Embodiment 1 of the present invention.

Scalable decoding apparatus 100 in FIG. 1 comprises: core layer decoding section 102; signal adjusting section 104; speech analyzing section 106; enhancement layer decoding section 108; enhancement layer loss detecting section 110; and decoded speech adding section 112.

Core layer coded data is inputted to core layer decoding section 102. Core layer decoding section 102 generates core layer decoded speech signal by decoding the core layer coded data.

Here, the core layer coded data refers to the coded data of the core layer corresponding to the narrowband, generated by layered-encoding a speech signal using a scalable coding apparatus (not shown). Further, the coded data generated by layered-coding at the scalable encoding apparatus includes enhancement layer encoded data in addition to core layer coded data. The enhancement layer coded data is coded data for the enhancement layer for making narrowband speech signals broadband and high quality.

Enhancement layer loss detecting section 110 detects whether or not enhancement layer coded data is decodable, in other words, whether or not the enhancement layer coded data is lost. A result of the detection is outputted to enhancement layer decoding section 108 as enhancement layer loss information. In the following description, enhancement layer loss information is referred to as loss[t]. Loss[t]=0 shows a loss of enhancement layer coded data, and loss[t]=1 shows a successful reception (no loss) of the enhancement layer coded data. Here, t is the frame number.

As a method of detecting whether or not decoding enhancement layer coded data is possible, for example, there is a method of receiving error information that provides a notice of error occurrence apart from enhancement layer coded data. Moreover, enhancement layer loss detecting section 110 executes an error detection using error checking code such as CRC (Cyclic Redundancy Check) added to the enhancement layer coded data. Moreover, enhancement layer loss detecting section 110 determines that the enhancement layer coded data has not arrived in the decoding time. Moreover, in the process of decoding enhancement layer coded data at enhancement layer decoding section 108, when a serious error is detected by, for example, the error detection code included in the enhancement layer coded data, enhancement layer loss detecting section 110 acquires the above information from enhancement layer decoding section 108. Furthermore, when the scalable speech codec in which core layer information is essential to the enhancement layer decoding is employed and an error is detected in the core layer, enhancement layer loss detecting section 110 decides that an error is detected in the enhancement layer.

Speech analyzing section 106 analyzes the decoded speech signal, and particularly analyzes and detects changes in power of the core layer decoded speech signal generated by core layer decoding section 102. The analysis information including the result of analysis on the power changes is outputted to enhancement layer decoding section 108. The internal configuration of speech analyzing section 106 will be described in detail later.

According to the analysis information inputted from speech analyzing section 106 and the enhancement layer loss information inputted from enhancement layer loss detecting section 110, enhancement layer decoding section 108 decodes the enhancement layer coded data and generates the enhancement layer decoded speech signal. The internal configuration of enhancement layer decoding section 108 will be described in detail later.

Signal adjusting section 104 executes an adjustment processing of adjusting the sampling rate, the delay and the phase of the core layer decoded speech signal and the enhancement layer decoded speech signal generated by core layer decoding section 102 and enhancement layer decoding section 108, respectively. In the present embodiment, signal adjusting section 104 matches the core layer decoded speech signal with the enhancement layer decoded speech signal in the sampling rate, delay and phase. The adjusted core layer decoded speech signal is outputted to decoded speech adding section 112.

Decoded speech adding section 112 adds the enhancement layer decoded speech signal generated in enhancement layer decoding section 108 and the core layer decoded speech signal adjusted in signal adjusting section 104. The added speech signal is outputted as the output speech signal of scalable decoding apparatus 100.

Figure 2:
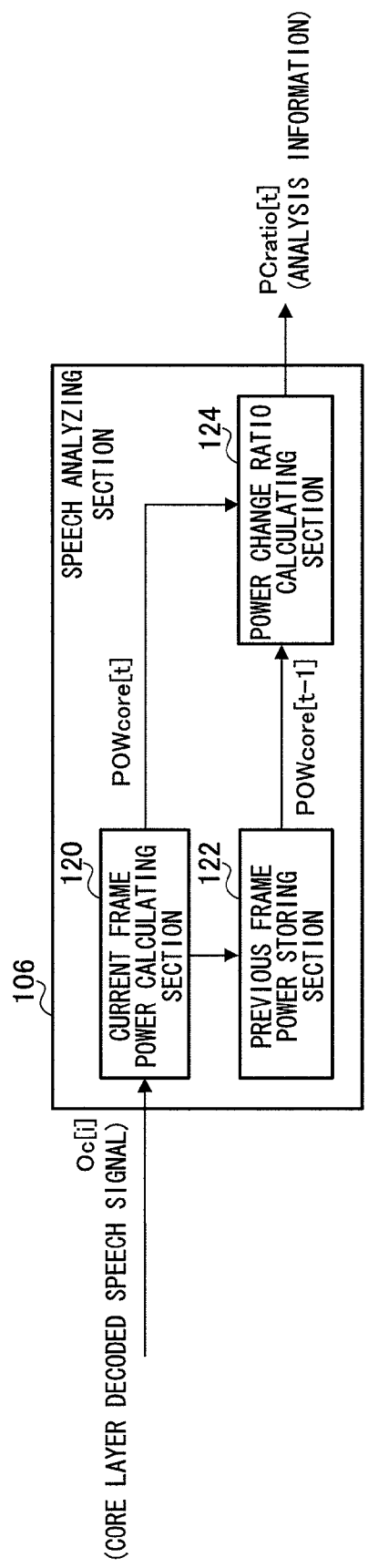
FIG. 2 is a block diagram showing the configuration of a speech analyzing section according to Embodiment 1 of the present invention.

Here, the internal configuration of speech analyzing section 106 will be explained in detail. As shown in FIG. 2, speech analyzing section 106 includes: current frame power calculating section 120; previous frame power storing section 122; and power change ratio calculating section 124.

Current frame power calculating section 120 calculates the power of the current frame of the core layer decoded speech signal using, for example, the following equation 1. The calculated current frame power is outputted to previous frame power storing section 122 and power change ratio calculating section 124.

[1]

$$POWcore[t] = \sum_{i=0}^{L\_FRAME-1} (Oc[i] * Oc[i]) \quad \text{(Equation 1)}$$

Here, POWcore[t], t, L_FRAME, i, and Oc[i] are power per frame, the frame number, the frame length, the sample number, and the core layer decoded speech signal, respectively.

Previous frame power storing section 122 stores the current frame power inputted from current frame power calculating section 120 by the number of essential frames. Power change ratio calculating section 124 refers to the stored current frame power as a previous frame power.

Power change ratio calculating section 124 compares the current frame power calculated at current frame power calculating section 120 with the previous frame power stored in previous frame power storing section 122, and detects changes in power between the present core layer decoded speech signal and the previous core layer decoded speech signal. More particularly, power change ratio calculating section 124 refers to the previous frame power stored in previous frame power storing section 122, for example, POWcore[t−1], when the current frame power, for example, POWcore[t] is inputted from current frame power calculating section 120, and calculates a power change ratio using, for example, the following equation 2.

[2]

$$PCratio[t]=\sqrt{POWcore[t]/POWcore[t-1]} \quad \text{(Equation 2)}$$

Here, PCratio[t] shows an amplitude rate converted from the power ratio between the current frame and the previous frame.

Further, a method for detecting power change is not limited to the above-described method. For example, to suppress an extreme power change and a change of decoded speech, it is possible to smooth the current frame power and the previous frame power using a plurality of different smoothing coefficients, and compare long term smoothed power of the core layer decoded speech signal calculated according to, for example, the following equation 3 with short term smoothed power calculated according to, for example, the following equation 4, and calculate the power change between the long term smoothed power and the short term smoothed power using the following equation 5.

[3]

$$POWLong=POWLong*\beta L+POWcore[t]*(1-\beta L) \quad \text{(Equation 3)}$$

[4]

$$POWShort=POWShort*\beta S+POWcore[t]*(1-\beta S) \quad \text{(Equation 4)}$$

[5]

$$PCratio[t]=\sqrt{POWShort/POWLong} \quad \text{(Equation 5)}$$

Here, POWLong is the long term smoothed power, and POWLong has a greater influence on the power of the previous frame. Moreover, POWShort is the short term smoothed power, and is calculated such that POWShort has a greater influence on the power of the current frame. Further, βL is the long term smoothing coefficient, βS is the short term smoothing coefficient, and the relationship between βL and βS is $0.0 \leq \beta S < \beta L < 1.0$.

Figure 3:
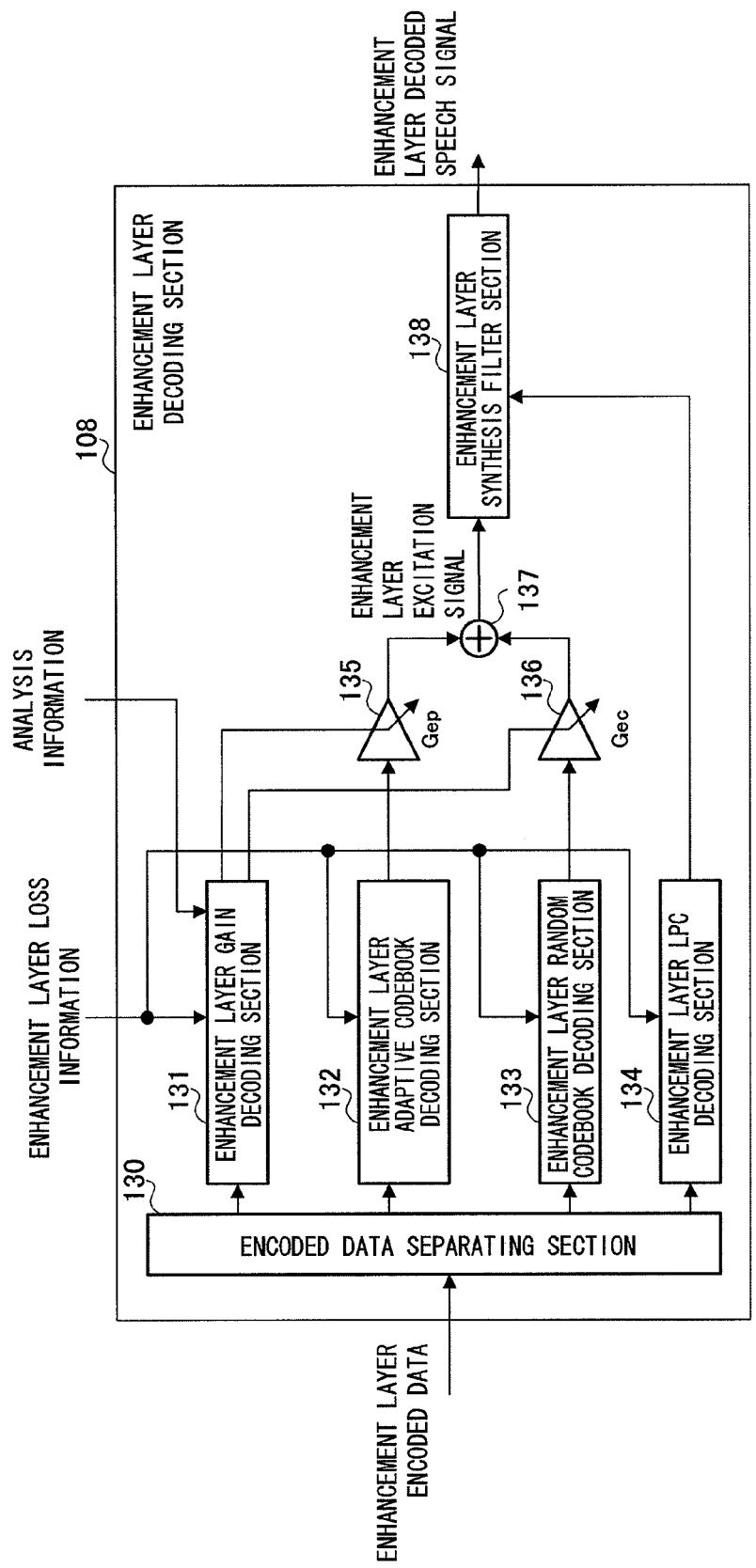
FIG. 3 is a block diagram showing the configuration of an enhancement layer decoding section according to Embodiment 1 of the present invention.

Next, the internal configuration of enhancement layer decoding section 108 will be described. Enhancement layer decoding section 108 employs a speech coding method based on the CELP (Code Excited Linear Prediction) method, and, as shown in FIG. 3, includes: encoded data separating section 130; enhancement layer gain decoding section 131; enhancement layer adaptive codebook decoding section 132; enhancement layer random codebook decoding section 133; enhancement layer LPC decoding section 134; pitch gain amplifying section 135; code gain amplifying section 136; excitation adding section 137 and enhancement layer synthesis filter section 138.

Encoded data separating section 130 separates the enhancement layer encoded data into the encoded data for the gain coefficient (the enhancement layer gain coefficient), the encoded data for the adaptive vector (the enhancement layer adaptive vector), the encoded data for the random codebook vector (the enhancement layer random codebook vector), and the encoded data for the LPC coefficients. The encoded data of the enhancement layer gain coefficient, the encoded data of the enhancement layer adaptive vector, the encoded data of the enhancement layer random codebook vector, and the encoded data of the LPC coefficients are outputted to enhancement layer gain decoding section 131, enhancement layer adaptive codebook decoding section 132, enhancement layer random codebook decoding section 133, and enhancement layer LPC decoding section 134, respectively. Enhancement layer adaptive codebook decoding section 132 stores the excitation signal generated in the past in a storage area, and clips the excitation signal for the pitch period based on the lag designated by the encoded data inputted from encoded data separating section 130. The clipped excitation signal is outputted to pitch gain amplifying section 135 as the enhancement layer adaptive vector. Further, when a loss of enhancement layer encoded data or loss[t]=0 is reported by the enhancement layer loss information inputted from enhancement layer loss detecting section 110, enhancement layer adaptive codebook decoding section 132 interpolates an enhancement layer adaptive vector, utilizing, for example, past lag or decoded information of the core layer.

Enhancement layer random codebook decoding section 133 generates an enhancement layer random codebook vector for expressing random signal components that cannot be expressed by pitch period components expressed by the enhancement layer adaptive codebook. Particularly, enhancement layer random codebook decoding section 133 algebraically generates an enhancement layer random codebook vector according to encoded data inputted from encoded data separating section 130 and outputs the generated enhancement layer random codebook vector to code gain amplifying section 136. When a loss of enhancement layer encoded data or loss[t]=0 is reported by the enhancement layer loss information inputted from enhancement layer loss detecting section 110, enhancement layer random codebook decoding section 133 interpolates an enhancement layer random codebook vector, utilizing, for example, decoded earlier information of enhancement layer, decoded information of the core layer and random number values.

Enhancement layer LPC decoding section 134 decodes the encoded data inputted from encoded data separating section 130 and obtains the enhancement layer LPC coefficients. The LPC coefficients are outputted to enhancement layer synthesis filter section 138. Further, when a loss of enhancement layer encoded data or loss[t]=0 is reported by the enhancement layer loss information inputted by enhancement layer loss detecting section 110, enhancement layer LPC decoding section 134 interpolates the enhancement layer LPC coefficients using, for example, a past decoding result of the enhancement layer LPC coefficients and core layer LPC coefficients. Further, when LPC coefficients are interpolated using core layer LPC coefficients and the linear prediction analysis order differs between the core layer and the enhancement layer, the order of core layer LPC coefficients is extended such that interpolation is executed using the LPC coefficients after the order extension processing.

Enhancement layer gain decoding section 131 decodes the enhancement layer gain coefficients from the encoded data inputted from encoded data separating section 130. Further, when a loss of enhancement layer encoded data or loss[t]=0 is reported by the enhancement layer loss information inputted from enhancement layer loss detecting section 110, enhancement layer gain decoding section 131 interpolates the enhancement layer gain coefficients by controlling the enhancement layer gain coefficients described later using a result of decoding the past enhancement layer gain coefficients and the analysis information inputted from speech analyzing section 106. The enhancement layer gain coefficients includes the pitch gain coefficient Gep corresponding to the pitch period component of the enhancement layer and the code gain coefficient Gec corresponding to the background noise component of the enhancement layer. The pitch gain coefficient Gep is outputted to pitch gain amplifying section 135 and the code gain coefficient Gec is outputted to code gain amplifying section 136. The internal configuration of enhancement layer gain decoding section 131 will be described later.

Pitch gain amplifying section 135 amplifies the enhancement layer adaptive vector inputted from enhancement layer adaptive codebook decoding section 132 using the pitch gain coefficient Gep inputted from enhancement layer gain decoding section 131, and outputs the amplified enhancement layer adaptive vector to excitation adding section 137.

Code gain amplifying section 136 amplifies the enhancement layer random codebook vector inputted from enhancement layer random codebook decoding section 133 using code gain coefficients Gec inputted from enhancement layer gain decoding section 131, and outputs the amplified enhancement layer random codebook vector to excitation adding section 137.

Excitation adding section 137 adds the enhancement layer adaptive vector inputted from pitch gain amplifying section 135 and the enhancement layer random codebook vector inputted from code gain amplifying section 136, and generates an enhancement layer excitation signal. The generated enhancement layer excitation signal is outputted to enhancement layer synthesis filter section 138.

Enhancement layer synthesis filter section 138 generates an enhancement layer decoded speech signal by configuring a synthesis filter using the enhancement layer LPC coefficients inputted from the enhancement layer LPC decoding section 134 and using the enhancement layer excitation signal inputted from excitation adding section 137 as a drive excitation signal. The generated enhancement layer decoded speech signal is outputted to decoded speech adding section 112. Further, post filtering processing is executed on the enhancement layer decoded speech signal.

Figure 4:
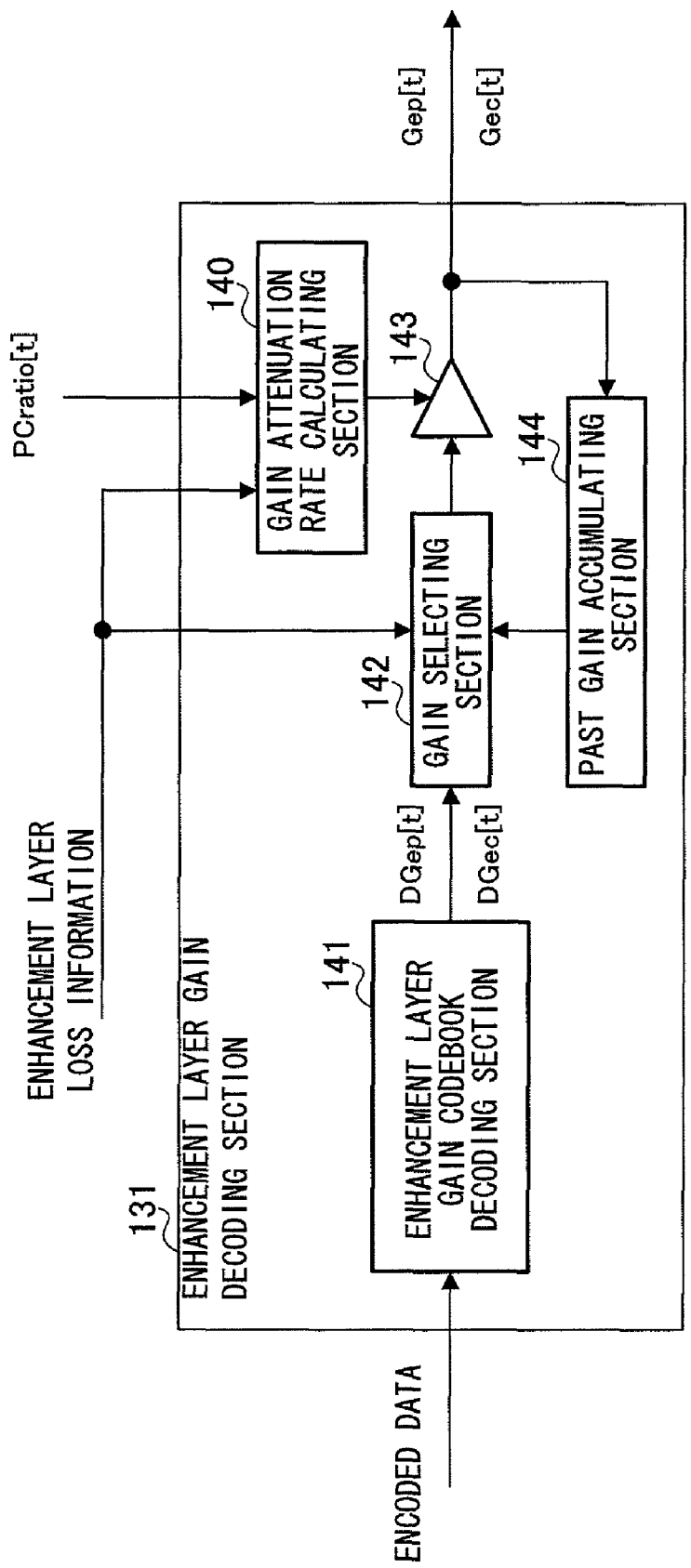
FIG. 4 is a block diagram showing the configuration of an enhancement layer gain decoding section according to Embodiment 1 of the present invention.

Next, the internal configuration of enhancement layer gain decoding section 131 and the control of enhancement layer gain coefficients will be described. As shown in FIG. 4, enhancement layer gain decoding section 131 includes: gain attenuation rate calculating section 140; enhancement layer gain codebook decoding section 141; gain selecting section 142, gain attenuation section 143; and past gain accumulating section 144.

When encoded data is inputted from encoded data separating section 130, enhancement layer gain codebook decoding section 141 decodes the inputted encoded data and obtains the pitch gain coefficient DGep[t] and the code gain coefficient DGec[t] for the enhancement layer of the current frame. The obtained pitch gain coefficient DGep[t] and the code gain coefficient DGec[t] are outputted to gain selecting section 142.

When a successful reception of enhancement layer encoded data or loss[t]=1 is reported by enhancement layer loss information, gain selecting section 142 outputs the pitch gain coefficient DGep[t] and code gain coefficients DGec[t] obtained by the decoding at enhancement layer gain codebook decoding section 141 to gain attenuation section 143 as the pitch gain coefficient Gep[t] of the current frame and the code gain coefficient Gec[t] of the current frame, respectively.

Further, when a loss of enhancement layer encoded data or loss[t]=0 is reported by enhancement layer loss information, gain selecting section 142 outputs the previous frame pitch gain coefficients stored in past gain accumulating section 144, for example, Gep[t−1], and the past frame code gain coefficients stored in past gain accumulating section 144, for example, Gec[t−1] to gain attenuation section 143 as the current frame pitch gain coefficient Gep[t] and the current frame code gain coefficient Gec[t], respectively.

Gain attenuation rate calculating section 140 sets the degree of attenuation executed at gain attenuation section 143, that is, the degree of attenuation of the pitch gain coefficient Gep[t] and the code gain coefficient Gec[t], based on the enhancement layer loss information loss[t] and the power change ratio PCratio[t] inputted as the analysis information. Setting the degree of attenuation is realized by calculating the gain attenuation rate Gatt[t]. The gain attenuation rate Gatt[t] is outputted to gain attenuation section 143.

More particularly, when a successful reception of enhancement layer encoded data or loss[t]=1 is reported, gain attenuation rate calculating section 140 decides the gain attenuation rate Gatt[t] as "1.0". Further, when a loss of enhancement layer encoded data or loss[t]=0 is reported and an increase in the power of the core layer decoded speech signal, or PCratio[t]≧1.0 is detected, gain attenuation rate calculating section 140 decides the gain attenuation rate Gatt[t] as "1.0". Further, when a loss of enhancement layer encoded data or loss[t]=0 is reported and a decrease in the power of the core layer decoded speech signal or PCratio[t]<1.0 is detected, gain attenuation rate calculating section 140 decides the gain attenuation rate Gatt[t] and PCratio[t] as the same value. As a result, the less degree of attenuation is obtained when an increase in the power of the core layer decoded speech signal is detected than a decrease in the power of the core layer decoded speech signal is detected. On the other hand, the greater degree of attenuation is obtained when a decrease in the power of the core layer decoded speech signal is detected than when increase in the power of the core layer decoded speech signal is detected. The above-described gain attenuation rate deciding method can be expressed using the following equation 6.

[6]
$$Gatt[t] = \begin{cases} 1.0 & \text{if } loss[t] = 1 \\ POWratio[t] & \text{if } loss[t] = 0 \text{ \& } POWratio[t] < 1.0 \\ 1.0 & \text{if } loss[t] = 0 \text{ \& } POWratio[t] \geq 1.0 \end{cases} \quad \text{(Equation 6)}$$

By multiplying the pitch gain coefficient Gep[t] and the code gain coefficient Gec[t] inputted from gain selecting section 142 by the gain attenuation rate Gatt[t] inputted from gain attenuation rate calculating section 140, gain attenuation section 143 outputs the pitch gain coefficient Gep[t] and the code gain coefficient Gec[t] after the multiplication processing to pitch gain amplifying section 135 and code gain amplifying section 136, respectively. Further, the pitch gain coefficient Gep[t] and the code gain coefficient Gec[t] after the multiplication processing are accumulated in past gain accumulating section 144. The pitch gain coefficients and code gain coefficients accumulated in past gain accumulating section 144 are referred to as previous frame pitch gain coefficients and code gain coefficients when interpolation on the pitch gain coefficient and the code gain coefficient is executed on the following frame. When enhancement layer encoded data is received successfully, gain attenuation section 143 outputs the pitch gain coefficient DGep[t] and the code gain coefficient DGec[t] obtained by decoding the encoded data for the current frame without attenuation. On the other hand, when enhancement layer encoded data is lost, gain attenuation section 143 attenuates the pitch gain coefficient Gep[t−1] and the code gain coefficient Gec[t−1] for the previous frame using the calculated gain attenuation rate Gatt[t] and outputs the pitch gain coefficient Gep[t−1] and the code gain coefficient Gec[t−1]. The attenuation processing is expressed using the following equation 7.

[7]

$$Gep[t]=Gep[t-1]*Gatt[t]*\beta$$

$$Gec[t]=Gec[t-1]*Gatt[t]*\gamma \quad \text{(Equation 7)}$$

Here, β and γ are coefficients for adjusting the amount of attenuation.

Next, an operation of control of the enhancement layer gain coefficients according to enhancement layer gain decoding section 131 of scalable decoding apparatus 100 having the above configuration will be described. Here, three examples of operations using FIG. 5A, FIG. 5B and FIG. 5C will be described.

Figure 5:
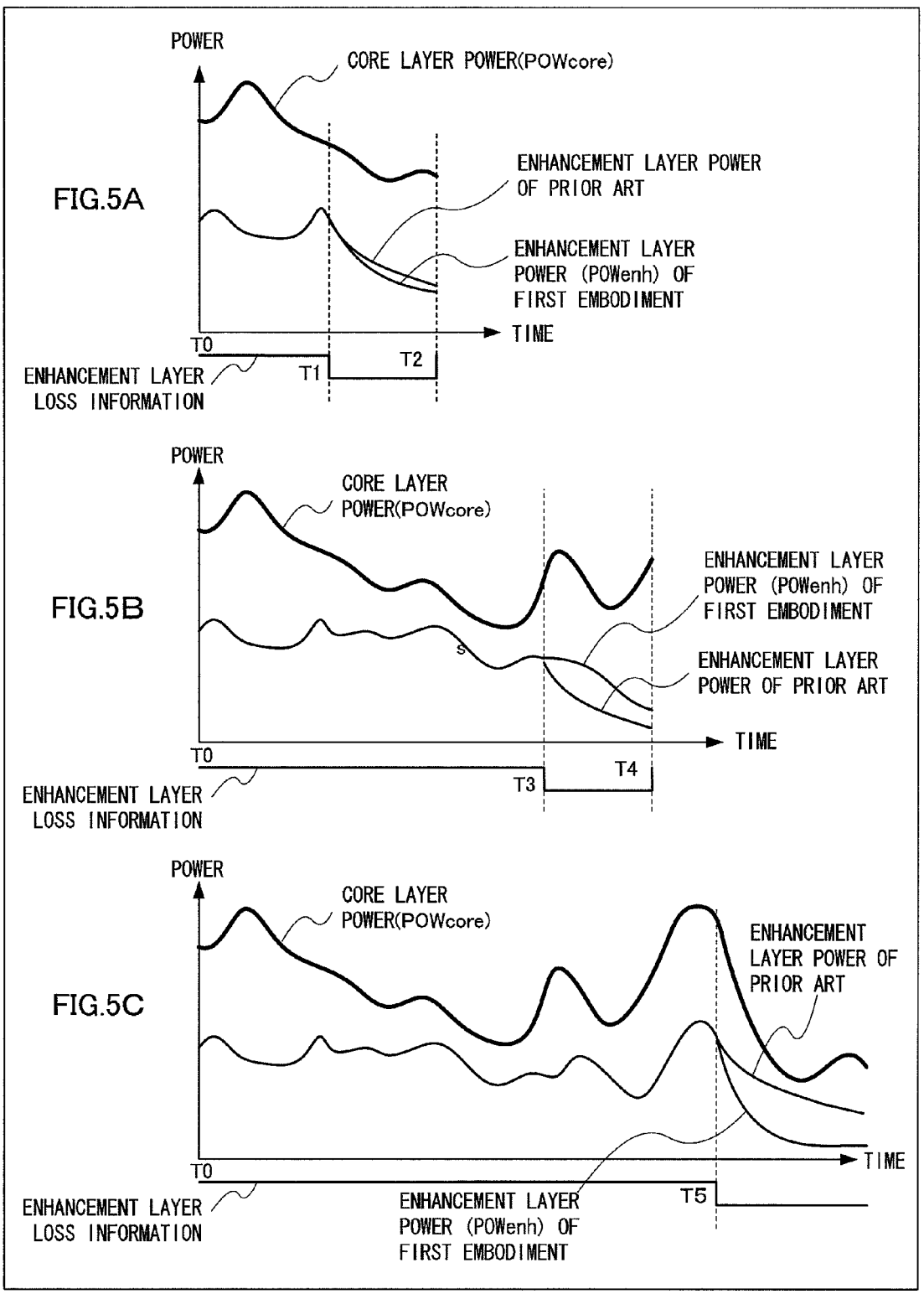
FIG. 5 shows an operation of controlling enhancement layer gain coefficients according to Embodiment 1 of the present invention.

In FIG. 5A, FIG. 5B and FIG. 5C, the horizontal axis is time. The waveform drawn in each figure shows changes in power of the decoded speech signal (the core layer decoded speech signal or the enhancement layer decoded speech signal), and the waveform below the time axis shows changes of the value of enhancement layer loss information.

Referring to the example shown in FIG. 5A, the enhancement layer is in a successful reception state between time T0 and T1, and is in a loss state between time T1 to T2. Further, when the enhancement layer switches from a successful reception state to a loss state, the core layer power (POWcore) is in a substantially fixed state, that is, in an unchanged state, the core layer power is on the slight decrease or the slight increase. In the prior art, when the enhancement layer is in a loss state, regardless of the state of changes in power of the core layer, the enhancement layer gain coefficients of previous frame is decreased monotonically by multiplying the enhancement layer gain coefficients by a constant (for example, 0.9). On the other hand, in the present embodiment, when the enhancement layer is in a loss state, the attenuation rate Gatt multiplied by the enhancement layer gain coefficients for a previous frame is set to be variable. Further, in this example, core layer power (POWcore) is substantially fixed when the enhancement layer is in a loss state. The waveform for enhancement layer power (POWenh) according to the present embodiment is thereby substantially the same as the waveform for the enhancement layer power according to the prior art.

Referring to the example shown in FIG. 5B, the enhancement layer is in a successful reception state between time T0 and T3 and is in a loss state between time T3 and T4. Further, when the enhancement layer switches from the successful reception state to the loss state, core power (POWcore) is on the dramatic increase. In this case, the influence of the enhancement layer decoded speech signal for the core layer decoded speech signal becomes less without attenuation of the enhancement layer gain coefficients. Therefore, the gain coefficient Gatt that lowers the degree of attenuation of the enhancement layer gain coefficients is set. As a result, it is possible to reduce enhancement layer power (POWenh) according to the present embodiment smoothly, while enhancement layer power is decreased monotonically regardless of the state of power changes of core layer according to the prior art.

Referring to the example shown in FIG. 5C, the enhancement layer is in a successful reception state between time T0 and time T5, and is in a loss state after time T5. Further, when the enhancement layer switches from the successful reception state to the loss state, core power (POWcore) is in an extreme decrease state. In this case, the influence of the enhancement layer decoded speech signal on the core layer decoded speech signal becomes higher. The gain coefficient Gatt that enhances the degree of attenuation for the enhancement layer gain coefficients is set. As a result, it is possible to reduce enhancement layer power (POWenh) according to the present embodiment dramatically, while enhancement layer power is decreased monotonically regardless of the state of power changes of core layer according to the prior art.

In this way, according to the present embodiment, when the enhancement layer encoded data of the current frame is lost, the enhancement layer gain coefficients for the current frame are interpolated by attenuating the enhancement layer gain coefficients for the previous frame, using a variably-set attenuation rate in accordance with changes in power of the core layer decoded speech signal. Therefore, it is possible to prevent the listeners from experiencing a disagreeable sensation or a sense of fluctuation according to enhancement layer loss, and prevent deterioration of subjective quality.

Further, different degrees of attenuation is provided between when a power increase of the core layer decoded signal is detected and when a power decrease of the core layer decoded signal is detected. Particularly, an attenuation rate is set to be greater when a decrease of the power of the core layer decoded signal is detected than when an increase of the power of the core layer decoded speech signal is detected, and the attenuation rate is set to be less when an increase of the power of the core layer decoded speech signal is detected than when a decrease of the power of the core layer decoded speech signal is detected. It is thereby possible to adjust the power of the enhancement layer appropriately according to the state of power changes of the core layer.

In the present embodiment, although the power change ratio is used as a parameter for detecting changes in power of the core layer, available parameters are not limited to the above example and it is also possible to use arbitrary parameters and functions related to the power of the decoded speech signal. For example, when CELP scheme is used as a core layer speech encoding method, the core layer gain coefficients and excitation signal power change ratio may be used as power change detection parameters for the core layer.

Further, in the present embodiment, although a frame is used as the time unit for speech encoding processing and is used as the time unit for interpolation processing of enhancement layer gain coefficients, a subframe shorter than a frame may be used as the time unit for the interpolation processing of enhancement layer gain coefficients.

(Embodiment 2)

Figure 6:
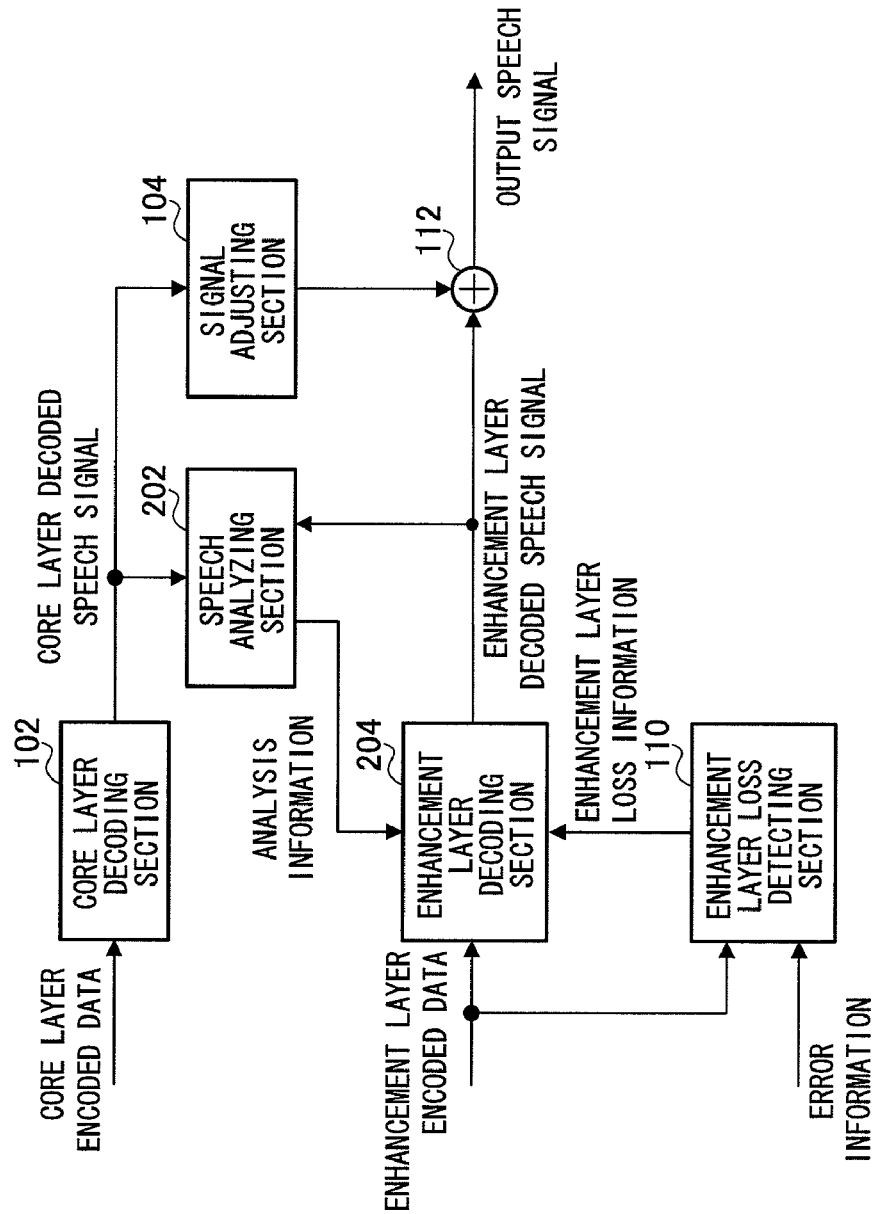
FIG. 6 is a block diagram showing the configuration of a scalable decoding apparatus according to Embodiment 2 of the present invention.

FIG. 6 is a block diagram showing the configuration of a scalable decoding apparatus according to Embodiment 2 of the present invention. The scalable decoding apparatus described in the present embodiment has the basic configuration similar to that of scalable decoding apparatus 100 described in Embodiment 1. Therefore, the same components explained in Embodiment 1 are assigned the same reference numerals and detailed explanations thereof will be omitted.

Scalable decoding apparatus 200 of FIG. 6 has a configuration that replaces speech analyzing section 106 and enhancement layer decoding section 108 of scalable decoding apparatus 100 with speech analyzing section 202 and enhancement layer decoding section 204, respectively.

Figure 7:
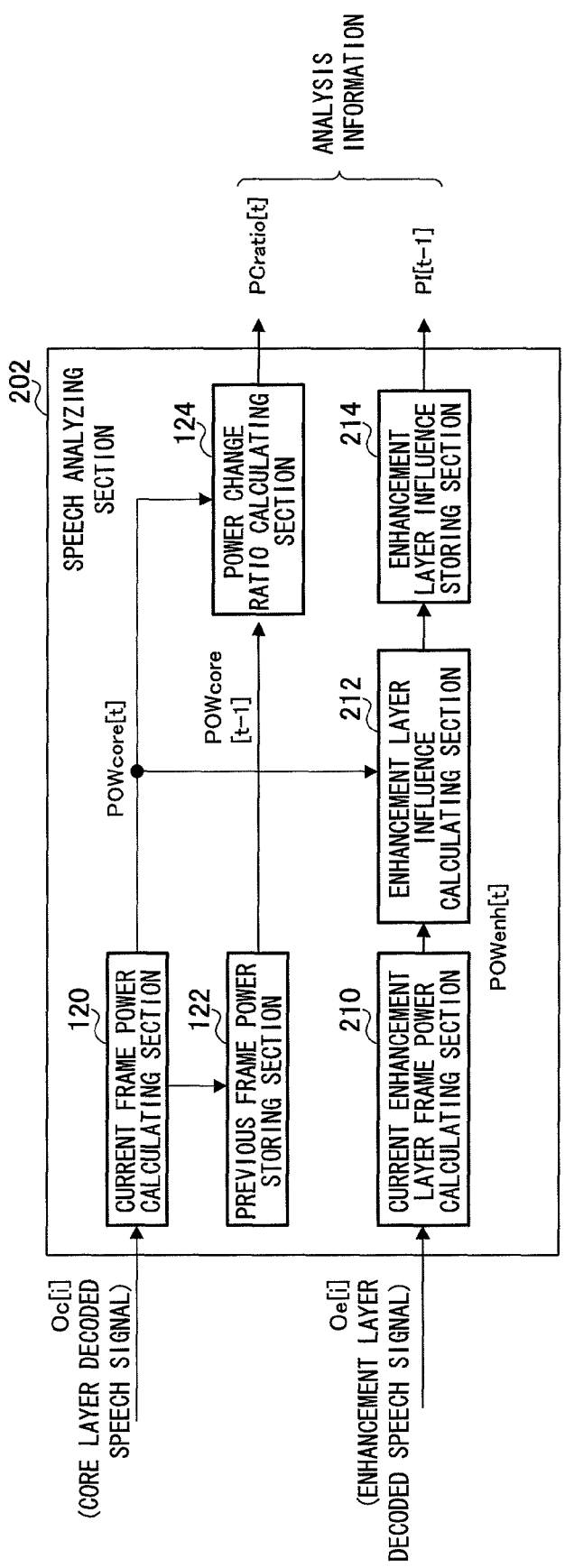
FIG. 7 is a block diagram showing the configuration of a speech analyzing section according to Embodiment 2 of the present invention.

Speech analyzing section 202 has a different internal configuration compared with an internal configuration of speech analyzing section 106 described in Embodiment 1. Particularly, as shown in FIG. 7, in addition to current frame power calculation section 120, previous frame power storing section 122, and power change ratio calculating section 124 described in Embodiment 1, speech analyzing section 202 includes current enhancement layer frame power calculating section 210, enhancement layer influence calculating section 212, and enhancement layer influence storing section 214.

Current enhancement layer frame power calculating section 210 calculates the power of the enhancement layer decoded speech signal for the current frame using the following equation 8.

$$POWenh[t] = \sum_{i=0}^{L\_FRAME-1} (Oe[i] * Oe[i]) \quad \text{(Equation 8)}$$

Here, POWenh[t] is the power of the enhancement layer decoded speech signal in frame t. Further, Oe[i] is the enhancement layer decoded speech signal of sample number i.

Enhancement layer influence calculating section 212 calculates the influence of the enhancement layer decoded speech signal in accordance with the output speech signal outputted from scalable decoding apparatus 200. In the present embodiment, enhancement layer influence calculating section 212 calculates the ratio between power POWenh[t] of the enhancement layer decoded speech signal of the current frame and power POWcore[t] of the core layer decoded speech signal of the current frame. That is, the above-described influence becomes greater as the value of the ratio becomes larger. The following equation 9 is used in the calculation of the influence.

$$PI[t] = POWenh[t]/POWcore[t] \quad \text{(Equation 9)}$$

Here, PI[t] is the influence of the enhancement layer in frame t.

Enhancement layer influence storing section 214 stores the influence calculated by enhancement layer influence calculating section 212. The influence stored in enhancement layer influence storing section 214 is outputted to enhancement layer decoding section 204 with the power change ratio calculated by power change ratio calculating section 124 as analysis information. The influence stored in enhancement layer influence storing section 214 is referred to as past influence, for example, PI[t−1] in the following frame.

Figure 8:
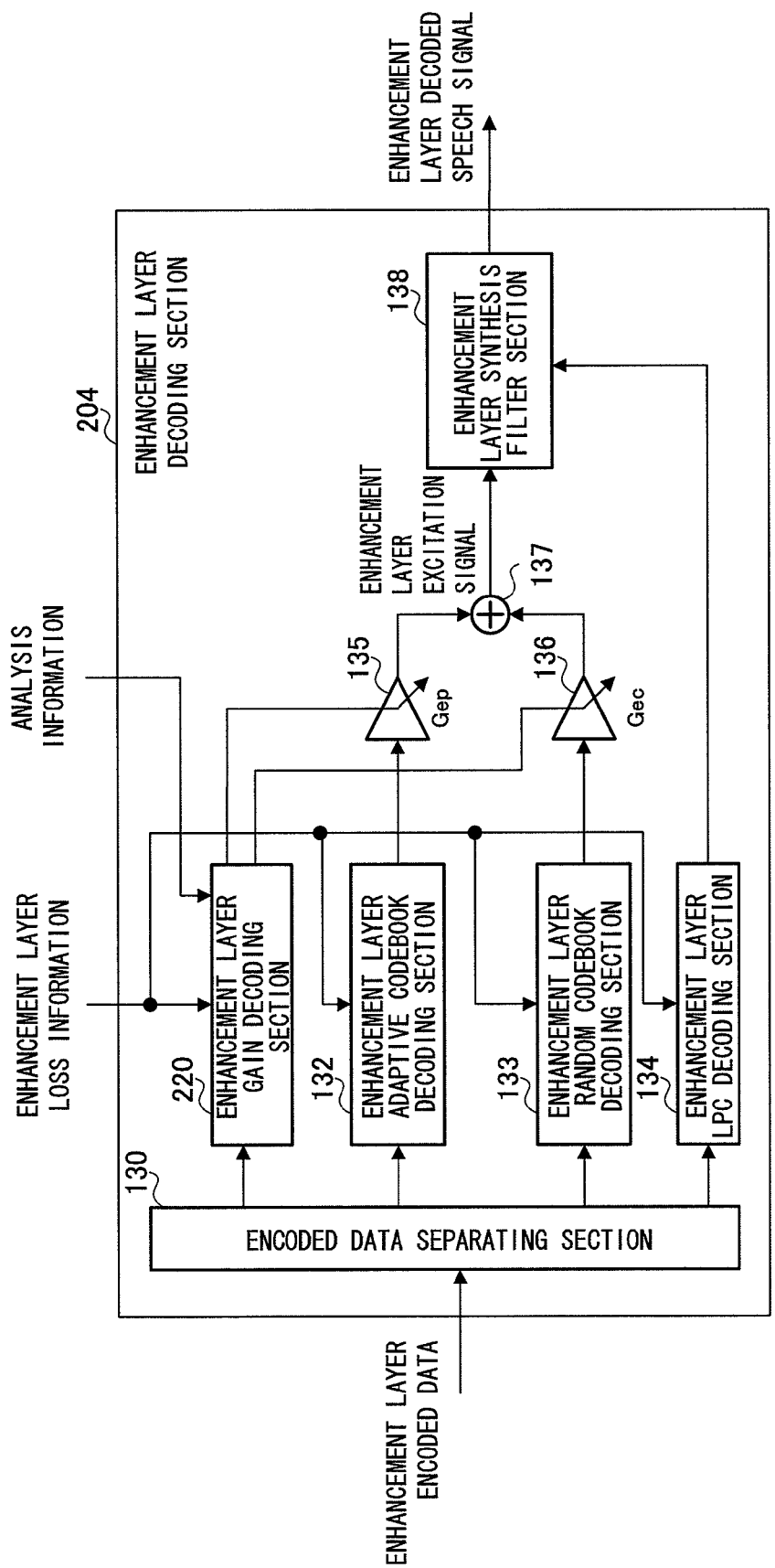
FIG. 8 is a block diagram showing the configuration of an enhancement layer decoding section according to Embodiment 2 of the present invention.

Enhancement layer decoding section 204 has a different internal configuration from the internal configuration of enhancement layer decoding section 108 described in Embodiment 1. As shown in FIG. 8, enhancement layer decoding section 204 has a configuration that replaces enhancement layer gain decoding section 131 of enhancement layer decoding section 108 with enhancement layer gain decoding section 220.

Figure 9:
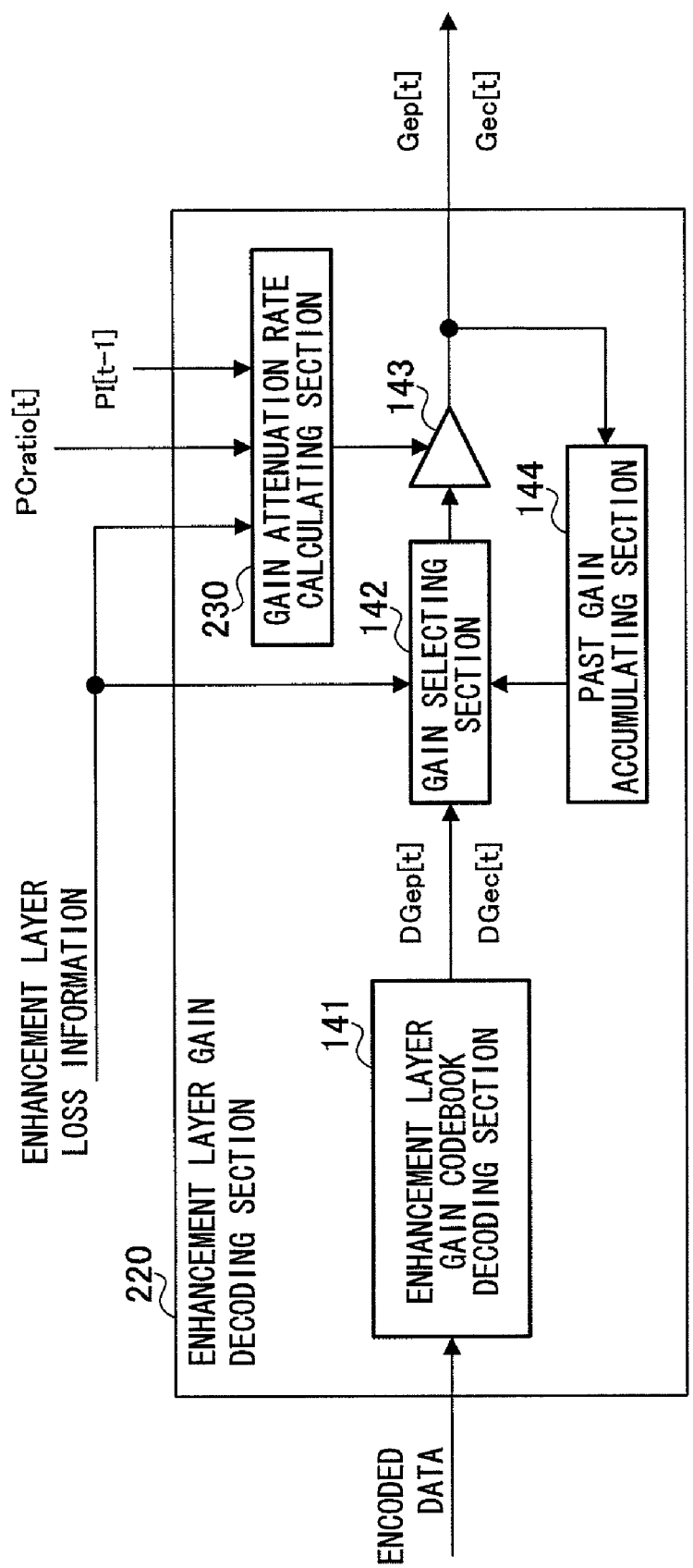
FIG. 9 is a block diagram showing the configuration of an enhancement layer gain decoding section according to Embodiment 2 of the present invention.

Enhancement layer gain decoding section 220 has a different internal configuration from the internal configuration of enhancement layer gain decoding section 131 described in Embodiment 1. As shown in FIG. 9, enhancement layer gain decoding section 220 has a configuration that replaces gain attenuation rate calculating section 140 of enhancement layer gain decoding section 131 with gain attenuation rate calculating section 230.

When a successful reception of enhancement layer encoded data, or loss[t]=1 is reported, gain attenuation rate calculating section 230 decides gain attenuation rate Gatt[t] as "1.0".

Further, when a loss of enhancement layer encoded data, or loss[t]=0, is reported, degrees of attenuation of the code gain coefficient Gec[t] and the pitch gain coefficient Gep[t] inputted from gain selecting section 142 are set based on enhancement layer loss information loss[t] and analysis information. Setting degrees of attenuation is executed by calculating the gain attenuation rate Gatt[t] in the same way described in Embodiment 1. Preferably, gain attenuation rate calculating section 230 sets the degree of attenuation for the code gain coefficient Gec[t] based on power change ratio PCratio[t], and the degree of attenuation for the pitch gain coefficient Gep[t] based on not only power change ratio PCratio[t] but also influence PI[t−1].

Particularly, when the influence of the enhancement layer decoded speech signal is high and sound quality of the enhancement layer decoded speech signal deteriorates due to interpolation, there is a high possibility that a disagreeable sensation is experienced, and it is necessary to attenuate the power of the enhancement layer decoded speech signal. Further, when the influence of the enhancement layer decoded speech signal is high, power is not concentrated in the core layer decoded speech signal, and so a speech interval mainly contains a background noise interval and a consonant interval instead of a vowel interval where pitch period components exist clearly. Therefore, in such case, it is preferable to attenuate the pitch gain coefficients that are the gain coefficients for an adaptive codebook output where past excitation signals are repeatedly used. For example, when influence PI[t−1] is equal to or greater than a predetermined value, gain attenuation rate calculating section 230 sets the degree of attenuation for the pitch gain coefficient Gep[t] greater than when influence PI[t−1] is less than the predetermined value. The gain attenuation rate Gatt[t] set for the pitch gain coefficient Gep[t] for the purpose of executing the above-described control is outputted to gain attenuation section 143.

On the other hand, when the influence of the enhancement layer decoded speech signal is low, power is gathered on the core layer decoded speech signal, so that deterioration is not obvious even if sound quality of the enhancement layer decoded speech signal deteriorates as a result of the interpolation. Further, when power is concentrated in the core layer decoded speech signal, a speech interval contains a vowel interval. In this case, pitch period components that cannot be expressed completely by the core layer are expressed, so that pitch period components also exist clearly in the enhancement layer. In this case, there is a low possibility that a disagreeable sensation is experienced. Therefore, gain attenuation rate calculating section 230 sets the degree of attenuation of pitch gain coefficient Gep[t] less when influence PI[t−1] is less than a predetermined value, than when influence PI[t−1] is equal to or greater than the predetermined value. The gain attenuation rate Gatt[t] set for the pitch gain coefficient Gep[t] to realize the above-described control is outputted to gain attenuation section 143.

Further, when the influence PI[t−1] of the enhancement layer decoded speech signal is less than a predetermined value, gain attenuation rate calculating section 230 may output an instruction of changing operation to gain attenuation section 143 instead of outputting the gain attenuation rate Gatt[t] for the pitch gain coefficient Gep[t] to gain attenuation section 143, such that the operation shown in the following equation 10 is executed.

[10]
$$Gep[t] = \begin{cases} Gep[t-1] * Gatt[t] * \beta & \text{if } PI[t-1] \geq \varepsilon \\ \gamma^K & \text{if } PI[t-1] < \varepsilon \end{cases} \quad \text{(Equation 10)}$$

Here, ε is threshold, γ is a constant less than "1.0", and K is the number of consecutively lost frames of enhancement layer encoded data. When γ is set to a value close to "1.0", it is possible to suppress attenuation of pitch gain coefficient Gep[t].

In this way, according to the present embodiment, the degree of attenuation is set variably according to the influence of the enhancement layer decoded speech signal. As a result, when interpolation deteriorates sound quality of the enhancement layer decoded speech signal, it is possible to attenuate the enhancement layer gain coefficient such that the power of the enhancement layer decoded speech signal is reduced in accordance with the power of the core layer decoded speech signal, and prevent disagreeable sound.

In the present embodiment, although a frame is used as the time unit for speech encoding processing and is used as the time unit for interpolation processing of enhancement layer gain coefficients, a subframe shorter than a frame may also be used as the time unit for the interpolation processing of enhancement layer gain coefficients.

(Embodiment 3)

Figure 10:
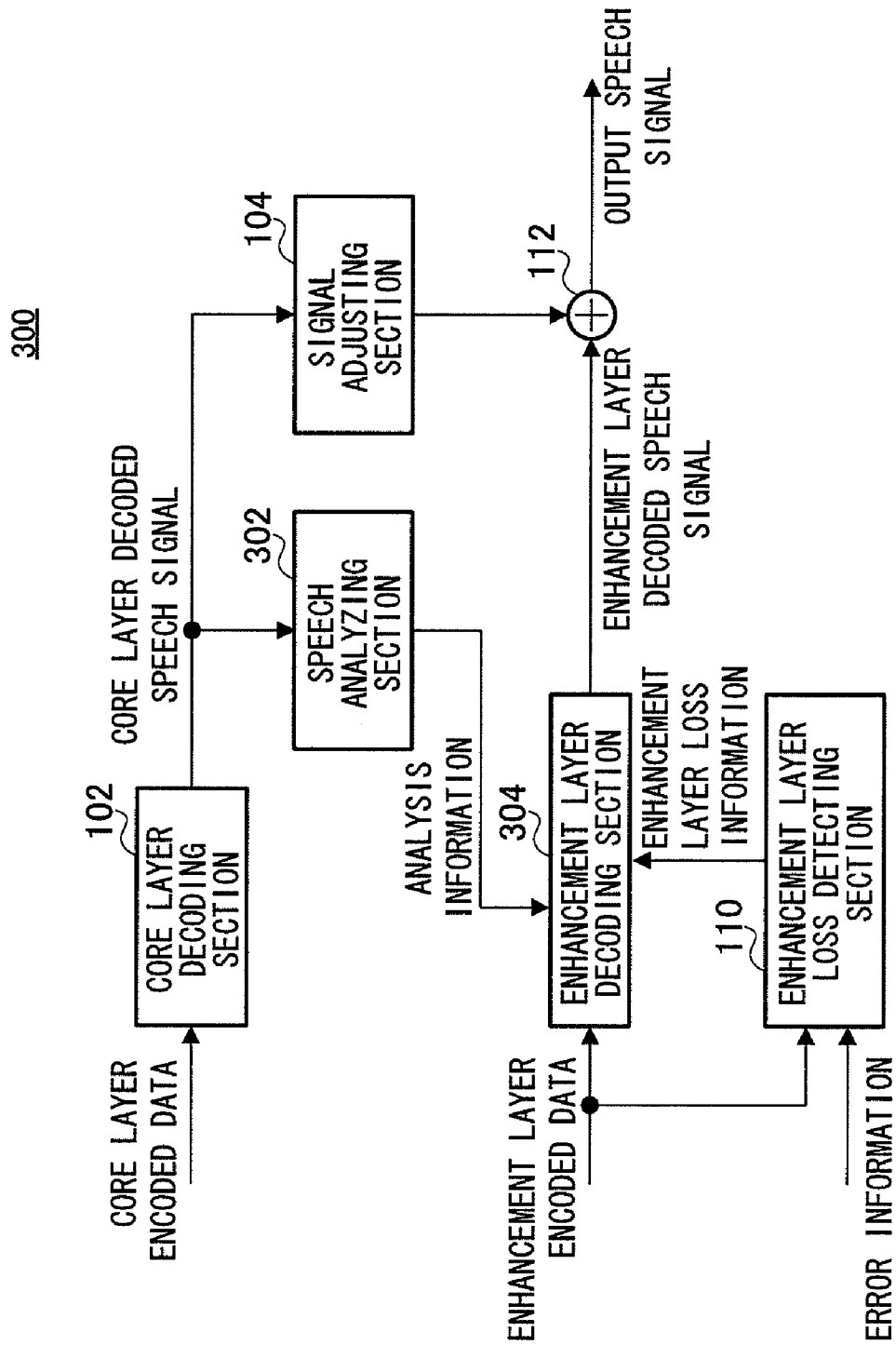
FIG. 10 is a block diagram showing the configuration of a scalable decoding apparatus according to Embodiment 3 of the present invention.

FIG. 10 is a block diagram showing a configuration of a scalable decoding apparatus according to Embodiment 3 of the present invention. Further, the scalable decoding apparatus described in the present embodiment has a basic configuration similar to that of scalable decoding apparatus 100 described in Embodiment 1. Therefore, the same components as those explained in Embodiment 1 are assigned the same reference numerals and detailed explanations thereof will be omitted.

Scalable decoding apparatus 300 of FIG. 10 has a configuration that replaces speech analyzing section 106 and enhancement layer decoding section 108 of scalable decoding apparatus 100 with speech analyzing section 302 and enhancement layer decoding section 304, respectively.

Figure 11:
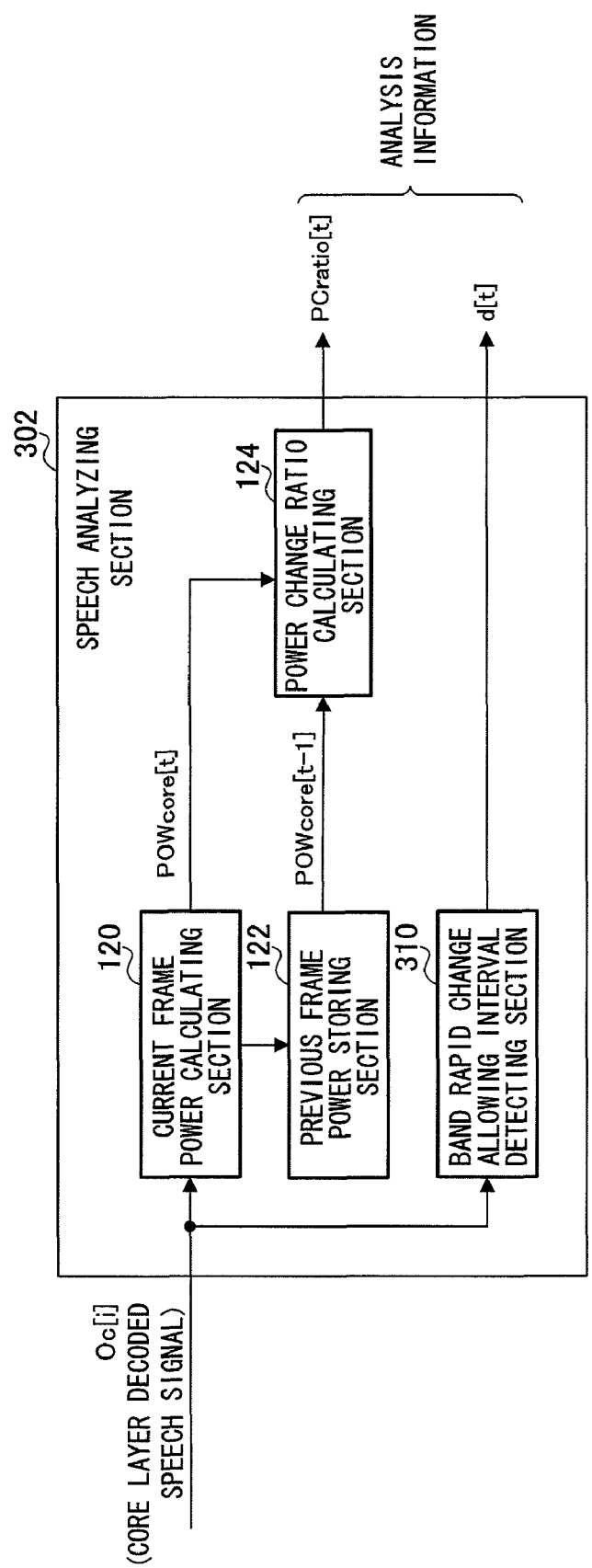
FIG. 11 is a block diagram showing the configuration of a speech analyzing section according to Embodiment 3 of the present invention.

Speech analyzing section 302 has a different internal configuration from speech analyzing section 106 described in Embodiment 1. Particularly, as shown in FIG. 11, speech analyzing section 302 has band rapid change allowing interval detecting section 310 in addition to current frame power calculating section 120, previous frame power storing section 122 and power change ratio calculating section 124 described in Embodiment 1.

Band rapid change allowing interval detecting section 310 analyzes the core layer decoded speech signal inputted from core layer decoding section 102 and detects an allowing interval based on a result of the analysis. A result of detecting the allowing interval is outputted to enhancement layer decoding section 304 as analysis information.

Here, the allowing interval is an interval where there is a low influence on a hearing sense even if the band of output speech signal rapidly changes, that is, a section where the listeners hardly perceive changes in the band of the output speech signal. By contrast, in intervals other than allowing intervals, the listeners easily perceive changes in band of the output speech signal. In the allowing interval, rapid changes in band of the output speech signal are allowed.

Band rapid change allowing interval detecting section 310 detects, for example, (a) an inactive speech interval, (b) a power changing interval, (c) a sound quality changing interval, or (d) an enhancement layer power micro interval, as an allowing interval.

(a) In an inactive speech interval, the power of the core layer decoded speech signal is extremely low. In the inactive speech interval, changes are hardly perceived when the gain of the enhancement layer decoded speech signal is rapidly changed. Detecting the inactive speech interval can be realized by detecting an interval where the power of the core layer decoded speech signal is equal to or less than a predetermined threshold. For example, the following equation 11 may be used upon detecting the inactive speech interval. In the case of using equation 11, a result of detecting allowing interval d(t) is outputted based on a result of the calculation. The result of detecting allowing interval d(t) is shown in the following equation (12).

[11]
$$Pc(t) = \sum_{i=0}^{L\_FRAME-1} Oc(i) * Oc(i) \quad \text{(Equation 11)}$$

[12]
$$d(t) = \begin{cases} 1, & Pc(t) < \varepsilon \\ 0, & \text{other} \end{cases} \quad \text{(Equation 12)}$$

Here, t, Pc(t), L_FRAME, i, Oc(i), d(t) and ε are the frame number, the power of the core layer decoded speech signal in frame t, the frame length, the sample number, the core layer decoded speech signal, the band rapid change allowing interval in frame t, and threshold, respectively. Here, d(t)=1 shows that an allowing interval is detected and d(t)=0 shows that a non-allowing interval is detected.

(b) In a power change interval, the power of the core layer decoded speech signal changes substantially. In the power change interval, hearing sense hardly perceives slight changes (for example, changes in the tone or band of output speech signal). Alternatively, the listeners do not experience a disagreeable sensation upon perceiving. Therefore, if the gain of the enhancement layer decoded speech signal changes rapidly, the change is hardly perceived. Detecting the power change interval can be performed by detecting a section in which the power change ratio calculated by power change ratio calculating section 124 is equal to or greater than a predetermined threshold. Alternatively, it is possible to detect the power change interval based on a result of calculating short term and long term smoothing power using, for example, the following equations 13 and 14. In this case, a result of detecting allowing interval d(t) is outputted according to equation 15.

[13]
$$Ps(t) = \alpha * Ps(t) + (1 - \alpha) * Pc(t) \quad \text{(Equation 13)}$$

[14]
$$Pl(t) = \beta * Pl(t) + (1 - \beta) * Pc(t) \quad \text{(Equation 14)}$$

[15]
$$d(t) = \begin{cases} 1, & Ps(t) > \gamma * Pl(t) \\ 0, & \text{other} \end{cases} \quad \text{(Equation 15)}$$

Here, Ps(t), α, Pl(t), β (0.0≦α<β<1.0) and γ are the short term smoothed power, the short term smoothing coefficient, the long term smoothed power, the long term smoothing coefficient and the adjusting coefficient, respectively.

Alternatively, detecting a power change interval can be performed by detecting speech at voice onset.

(c) In a sound quality changing interval, sound quality of the core layer decoded speech signal (or enhancement layer decoded speech signal) changes substantially. In the sound quality changing interval, the core layer decoded speech signal (or the enhancement layer decoded speech signal) is in a loss of time continuity for the hearing sense. In this case, if the gain of the enhancement layer decoded speech signal changes rapidly, the change is hardly perceived. Detecting the sound quality change section can be realized by detecting rapid changes of background noise signal type included in the core layer decoded speech signal (or enhancement layer decoded speech signal).

Alternatively, detecting the sound quality changing interval can be realized by detecting changes in a spectral parameter (for example, LSP) of core layer encoded data. For example, when the total distance between components of past LSP and components of current LSP is compared with a predetermined threshold and it is detected that the total distance is equal to or greater than the threshold, changes in LSP can be detected. In this case, for example, the following equation 16 is used for detecting a sound quality changing section. In the case of using equation 16, a result of detecting an allowing interval d(t) is outputted based on a result of the calculation using the equation. The result of detecting an allowing interval d(t) is shown in the following equation 17.

[16]

$$dlsp(t) = \sum_{m=2}^{M} (lsp[m] - lsp[m-1])^2 \quad \text{(Equation 16)}$$

[17]

$$d(t) = \begin{cases} 1, & \dfrac{dlsp(t)}{dlsp(t-1)} < 1/A \text{ or } \dfrac{dlsp(t)}{dlsp(t-1)} > A \\ 0, & \text{other} \end{cases} \quad \text{(Equation 17)}$$

Here, lsp, M, m, dlsp and A are the core layer LSP coefficient, the analysis order of the core layer linear predictor coefficient, the LSP element number, the distance between neighboring elements, and threshold, respectively.

Alternatively, band rapid change allowing interval detecting section 310 may detect the predetermined number of frames where interpolation processing has been executed on the core layer decoded speech signal (or enhancement layer decoded speech signal) according to a core layer frame error (or enhancement layer frame error) as a sound quality changing interval.

(d) In an enhancement layer power micro interval, the power of the enhancement layer decoded speech signal is extremely low. In the enhancement layer power micro interval, changes are hardly perceived if the band of output speech signal changes dramatically. Therefore, if the gain of the enhancement layer decoded speech signal changes rapidly, the changes are hardly perceived. The enhancement layer power micro interval can be detected when the power of the enhancement layer decoded speech signal is equal to or less than a predetermined threshold.

Alternatively, detecting an enhancement layer power micro interval may be performed by detecting a section where the power ratio between the enhancement layer decoded speech signal and the core layer decoded speech signal is equal to or less than a predetermined value. In this case, for example, the following equation 18 is used for detecting the enhancement layer power micro interval. In the case of using equation 18, a result of detecting allowing interval d(t) is outputted based on a result of the calculation. The result of detecting the allowing interval d(t) is shown in the following equation 19.

[18]

$$Pe(t) = \sum_{i=0}^{L\_FRAME-1} Oe(i) * Oe(i) \quad \text{(Equation 18)}$$

[19]

$$d(t) = \begin{cases} 1, & Pe(t) < B \\ 1, & \dfrac{Pe(t)}{Pc(t)} < C \\ 0, & \text{others} \end{cases} \quad \text{(Equation 19)}$$

Here, Oe(i), Pe(t) and B and C are the enhancement layer decoded speech signal, the enhancement layer decoded speech signal power, and the threshold value, respectively.

Figure 12:
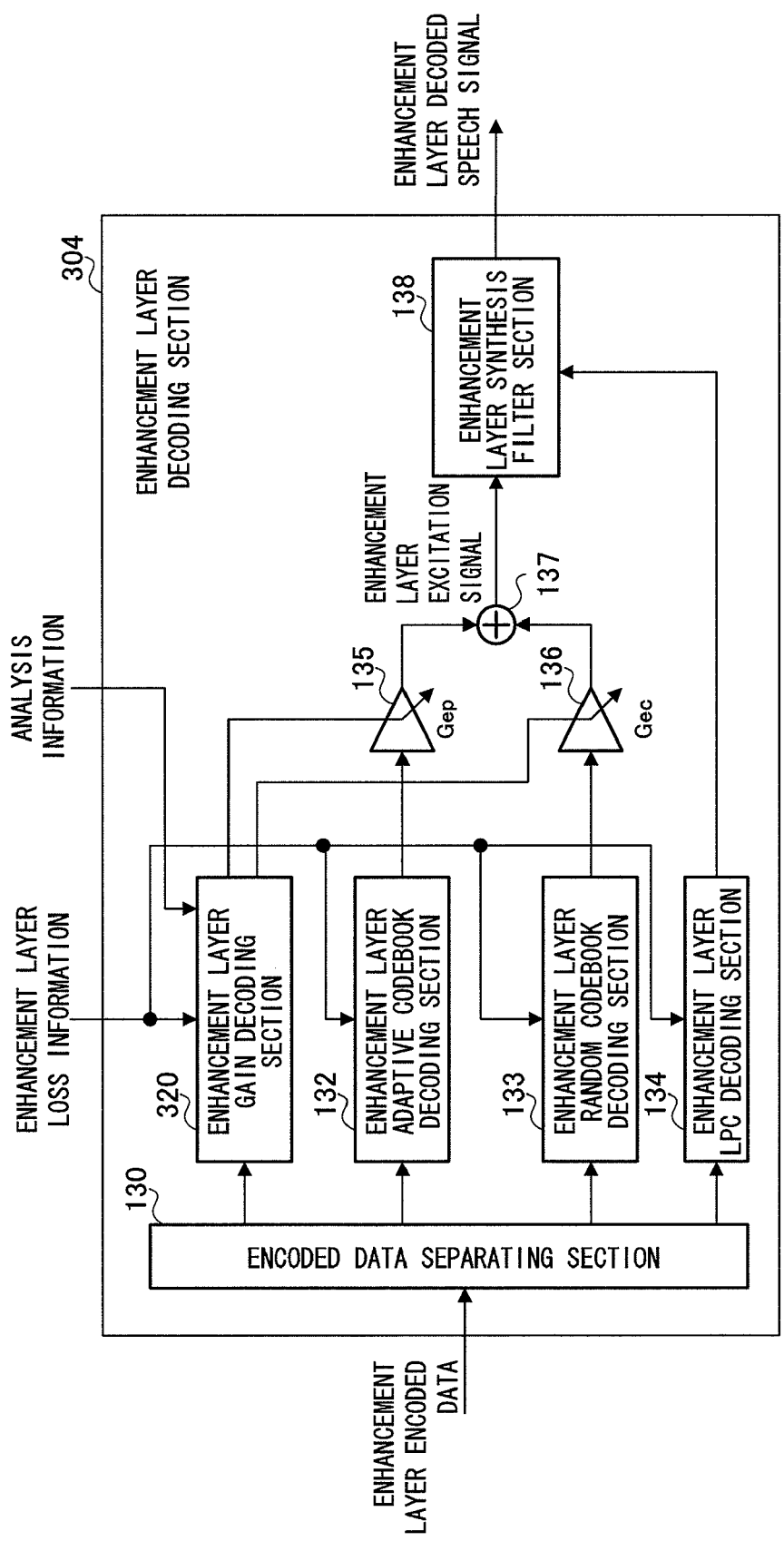
FIG. 12 is a block diagram showing the configuration of an enhancement layer decoding section according to Embodiment 3 of the present invention.

Enhancement layer decoding section 304 has a different internal configuration from enhancement layer decoding section 108 described in Embodiment 1. As shown in FIG. 12, enhancement layer decoding section 304 has a configuration that replaces enhancement layer gain decoding section 131 of enhancement layer decoding section 108 with enhancement layer gain decoding section 320.

Figure 13:
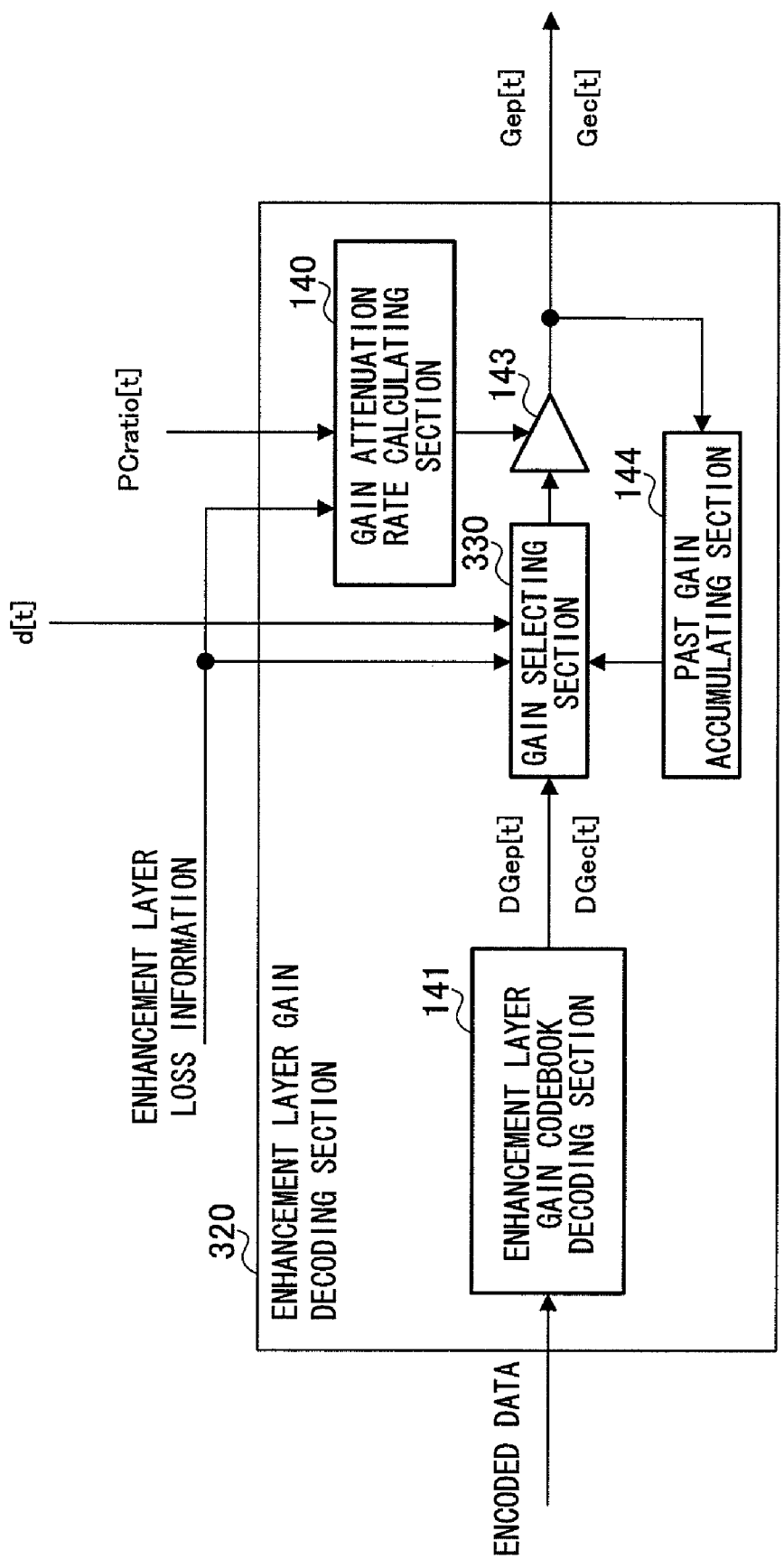
FIG. 13 is a block diagram showing the configuration of an enhancement layer gain decoding section according to Embodiment 3 of the present invention.

Enhancement layer gain decoding section 320 has a different internal configuration from enhancement layer gain decoding section 131 described in Embodiment 1. As shown in FIG. 13, enhancement layer gain decoding section 320 has a configuration that replaces gain selecting section 142 of enhancement layer gain decoding section 131 with gain selecting section 330.

Gain selecting section 330 executes a different operation from gain selecting section 142, only in the enhancement layer restoring period where a loss of enhancement layer encoded data ended and the successful receiving state for the enhancement layer encoded data was recovered.

Gain selecting section 330 switches the outputted enhancement layer gain coefficients according to the value of a result of detecting the allowing interval d(t) of the output of band rapid change allowing interval detecting section 310 in the enhancement layer power restoring period.

When the value of the result of allowing interval detecting d(t) is 1, that is, when an allowing interval is detected, rapid changes of band are hardly perceived and gain selecting section 330 decides the enhancement layer gain coefficients that make the power of the enhancement layer decoded speech signal restore faster than when the value of the result of detecting allowing interval d(t) is 0 (that is, when a non-allowing interval is detected).

As for the pitch gain coefficient Gep[t], gain selecting section 330 decides the pitch gain coefficient DGep[t] obtained by decoding at enhancement layer gain codebook decoding section 141 as the pitch gain coefficient Gep[t] for the current frame when the enhancement layer power restoring period is in an allowing interval. On the other hand, when the enhancement layer power restoring period is out of the allowing interval, a result of weighting addition of the pitch gain coefficient DGep[t] and the pitch gain coefficient, for example, Gep[t−1] for the previous frame stored in past gain accumulating section 144 is decided as pitch gain coefficient Gep[t] for the current frame. The deciding method can be expressed by the following equation 20.

[20]

$$Gep[t] = \begin{cases} DGep[t] & \text{if } d[t] = 1 \\ (DGep[t] + Gep[t-1])/2 & \text{if } d[t] = 0 \end{cases} \quad \text{(Equation 20)}$$

As for the code gain coefficient Gec[t], when the enhancement layer power restoring period is in the allowing interval, gain selecting section 330 decides a result of weighting addition for the code gain coefficient DGec[t] obtained by decoding at enhancement layer gain codebook decoding section 141 and, for example, the code gain coefficient Gec[t−1] for the previous frame stored in past gain accumulating section 144 as the code gain coefficient Gec[t] for the current frame. On the other hand, when the enhancement layer power restoring period is out of the allowing interval, the code gain coefficient having a lower value of the code gain coefficient Gec[t] obtained by decoding and, for example, the code gain coefficient Gec[t−1] for the previous frame, is decided as the code gain coefficient Gec[t] for the current frame. The deciding method can be expressed by the following equation 21.

[21]

$$Gec[t] = \begin{cases} (DGec[t] + Gec[t-1])/2 & \text{if } d[t] = 1 \\ \min(DGec[t], Gec[t-1]) & \text{if } d[t] = 0 \end{cases} \quad \text{(Equation 21)}$$

Next, the enhancement layer gain coefficient control operation in enhancement layer gain decoding section 320 of scalable decoding apparatus 300 having the above configuration will be described. Here, two examples of operations will be described using FIG. 14A and FIG. 14B.

Figure 14A:
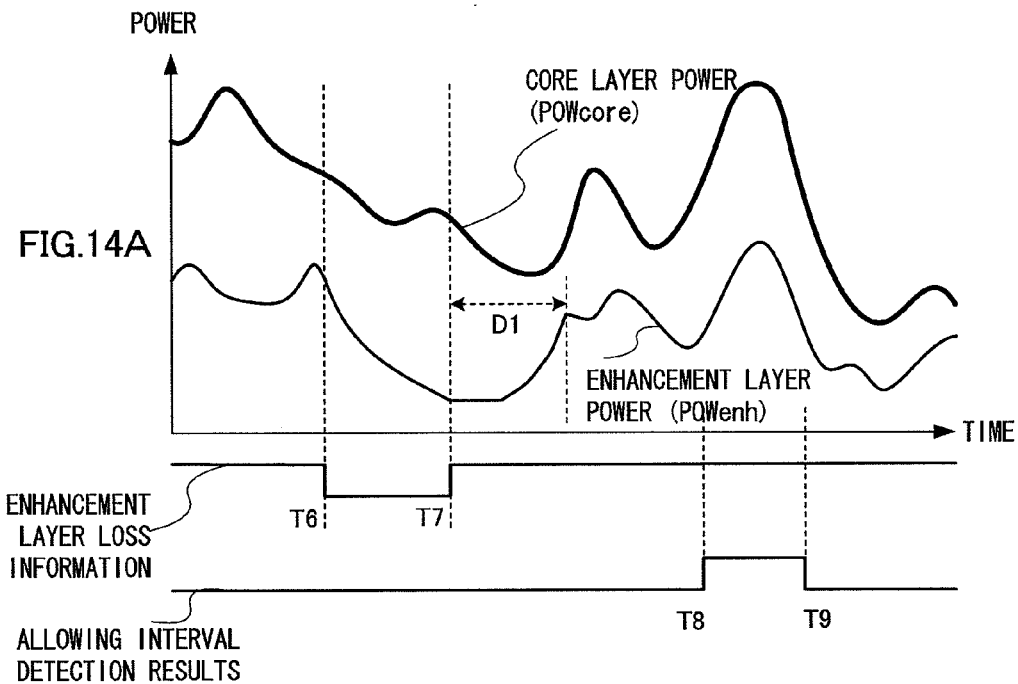
FIG. 14 shows an operation of controlling enhancement layer gain coefficients according to Embodiment 3 of the present invention.
Figure 14B:
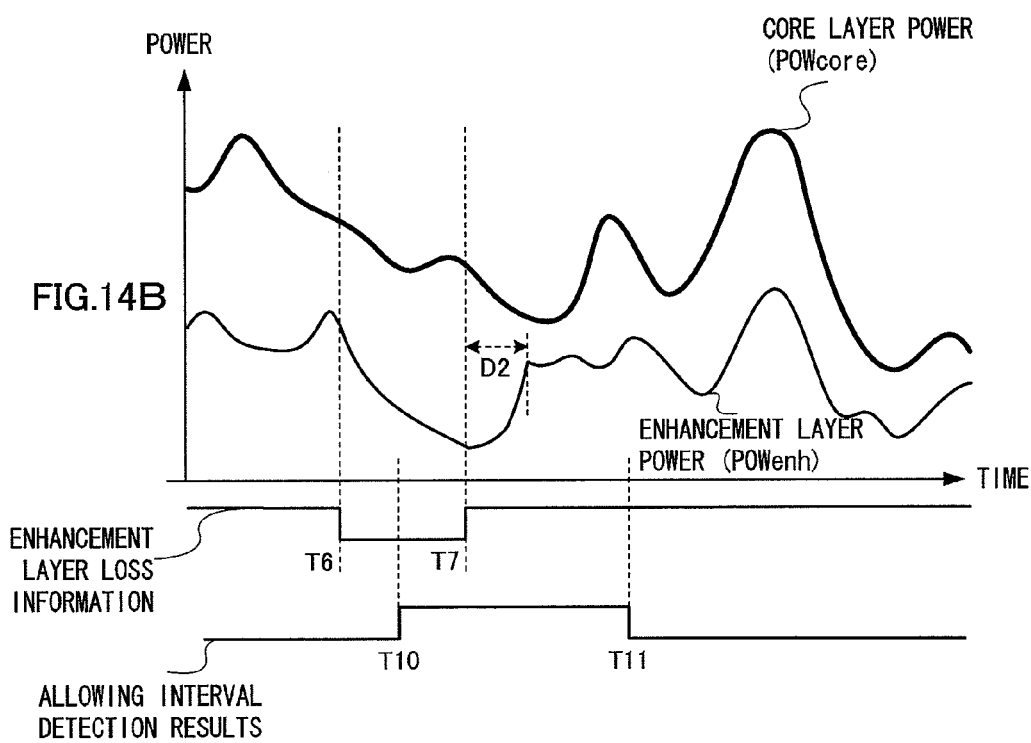

In FIG. 14A and FIG. 14B, the horizontal axis is time. The waveform drawn in each FIG. shows changes in power of decoded speech signal (core layer decoded speech signal or enhancement layer decoded speech signal). One waveform below the time axis shows changes in the value of enhancement layer loss information and the other waveform shows changes in the value of a result of detecting the allowing interval.

Referring to the example shown in FIG. 14A, the enhancement layer is in a loss state only between time T6 and T7. Further, the interval between time T8, where quite long time has past since T7, and T9 is an allowing interval of rapid band changes. In this example, enhancement layer power restoring period D1 after time T7 is in a non-allowing interval and outside the allowing interval. Therefore, in enhancement layer gain decoding section 320, gain selecting section 330 decides the enhancement layer gain coefficients such that power of the enhancement layer decoded speech signal is restored in a relatively slow pace.

Referring to the example shown in FIG. 14B, the enhancement layer is in a loss state only between time T6 and time T7 similar to the above-described example. Further, the interval between time T10 and T11 is an allowing interval for rapid band changes similar to the latter half of the interval of the above-described loss state. That is, in this example, enhancement layer power restoring period D2 after time T7 is in the allowing interval. Therefore, in enhancement layer gain decoding section 320, gain selecting section 330 decides the enhancement layer gain coefficients such that the power of the enhancement layer decoded speech signal is restored faster. Therefore, enhancement layer power restoring period D2 is shorter than enhancement layer power restoring period D1.

According to the present embodiment, when the enhancement layer power restoring period is in the allowing interval of rapid band changes, the enhancement layer gain coefficients are decided such that the power of the enhancement layer decoded speech signal is restored faster than when the enhancement layer power restoring period is outside the allowing interval. As a result, in the period where rapid band changes are allowed, the power of the enhancement layer decoded speech signal can be rapidly restored, so that it is possible to restore the band of output speech signal from a narrowband to a broadband rapidly without giving the listeners a sensation of band changes or a disagreeable sound.

Although a case has been described with the present embodiment where a configuration that controls the enhancement layer gain coefficients according to an allowing interval or non-allowing interval is incorporated in the configuration of Embodiment 1 as an example, the configuration having the above configuration can be incorporated in the configuration described in Embodiment 2.

Further, in the present embodiment, although a frame is used as the time unit for speech encoding processing and is used as the time unit for the control processing of enhancement layer gain coefficients, a subframe shorter than a frame may be used as the time unit for the control processing of enhancement layer gain coefficients.

Furthermore, each function block employed in the description of each of the aforementioned embodiments may typically be implemented as an LSI constituted by an integrated circuit. These may be individual chips or partially or totally contained on a single chip.

"LSI" is adopted here but this may also be referred to as "IC", "system LSI", "super LSI", or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells in an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The present application is based on Japanese Patent Application No. 2005-071504, filed on Mar. 14, 2005, the entire content of which is expressly incorporated by reference herein.

Industrial Applicability

The scalable decoding apparatus and scalable decoding method of the present invention are useful upon decoding a layer encoded signal (for example, a speech signal and audio signal).

The invention claimed is:

1. A scalable decoding apparatus that decodes core layer encoded information and enhancement layer encoded information comprising enhancement layer gain coefficients, the scalable decoding apparatus comprising:

a core layer decoder that generates a core layer decoded speech signal by decoding core layer coded data;

a current frame power calculator that calculates a power of a current frame of the core layer decoded speech signal generated by the core layer decoder;

a previous frame power storer that stores the current frame power calculated by the current frame power calculator by a number of essential frames;

a change detector that detects a change in power of the core layer decoded speech signal by comparing the current frame power calculated by the current frame power calculator with a previous frame power stored in the previous frame power storer;

a setter that variably sets a degree of attenuation according to the detected change in power so as to (i) set the degree of attenuation greater when a power decrease of the core layer decoded speech signal is detected than when a power increase of the core layer decoded speech signal is detected or (ii) set the degree of attenuation less when the power increase of the core layer decoded speech signal is detected than when the power decrease of the core layer decoded speech signal is detected; and an attenuator that attenuates enhancement layer gain coefficients for a second interval earlier than the first interval according to the set degree of attenuation and interpolates enhancement layer gain coefficients for the first interval, when enhancement layer encoded information of a first interval is lost.

2. The scalable decoding apparatus according to claim 1, wherein the setter provides different degrees of attenuation between when the power increase of the core layer decoded speech signal is detected and when the power decrease of the core layer decoded speech signal is detected.

3. The scalable decoding apparatus according to claim 1, wherein the change detector compares short term smoothed power of the core layer decoded speech signal with long term smoothed power of the core layer decoded speech signal, and detects the change in the power of the core layer decoded speech signal.

4. The scalable decoding apparatus according to claim 1, further comprising:

a current enhancement layer frame power calculator that calculates a power of a current frame of the enhancement layer decoded speech signal obtained from the enhancement layer encoded information; and a calculator that calculates a ratio of current enhancement layer frame power calculated by the current enhancement layer frame power calculator with respect to the current frame power calculated by the current frame power calculator;

wherein the setter variably sets the degree of attenuation according to the calculated power ratio so as to (iii) set the degree of attenuation greater when a calculated power ratio is greater than a predetermined value than when the calculated power ratio is less than the predetermined value or (iv) set the degree of attenuation less when the calculated power ratio is less than the predetermined value than when the calculated power ratio is greater than the predetermined value.

5. The scalable decoding apparatus of claim 1, wherein:

a decoded signal obtained by decoding core layer encoded information and enhancement layer encoded information comprises a speech signal;

the enhancement layer gain coefficients comprise a first gain coefficient corresponding to a pitch interval component of an enhancement layer and a second gain coefficient corresponding to a background noise component of the enhancement layer;

the setter sets a first degree of attenuation corresponding to the first gain coefficient according to the detected power change and the calculated power ratio and sets a second degree of attenuation corresponding to the second gain coefficient according to the detected power change alone; and the attenuator attenuates the first gain coefficient of the second interval according to the set first degree of attenuation and attenuates the second gain coefficient of the second interval according to the set second degree of attenuation.

6. The scalable decoding apparatus of claim 1, further comprising:

an interval detector that detects an allowing interval where a change in a band of the core layer decoded speech signal generated by the core layer decoder is allowed; and a decider that, when an allowing interval where an interval detection result obtained by the interval detector is 1 is detected, decides enhancement layer gain coefficients so as to make a power of enhancement layer decoded speech signal restore faster than when a non-allowing interval where the interval detection result obtained by the interval detector is 0 is detected.

7. The scalable decoding apparatus of claim 6, wherein:

the decoded speech signal comprises a speech signal; and the interval detector detects an inactive speech interval as the allowing interval.

8. The scalable decoding apparatus of claim 6, wherein the interval detector detects an interval where the power of the core layer decoded speech signal is at or below a predetermined level as the allowing interval.

9. The scalable decoding apparatus of claim 6, wherein the interval detector detects an interval where the power of the enhancement layer decoded speech signal is at or below a predetermined level as the allowing interval.

10. The scalable decoding apparatus of claim 6, wherein the interval detector detects an interval where a ratio of the power of the enhancement layer decoded speech signal with respect to the power of the core layer decoded speech signal is at or below a predetermined level as the allowing interval.

11. The scalable decoding apparatus of claim 6, wherein the interval detector detects an interval where the power change detected by the change detector is at or above a predetermined level as the allowing interval.

12. The scalable decoding apparatus of claim 6, wherein:

the decoded speech signal comprises a speech signal; and the interval detector detects a rise of speech as the allowing interval.

13. The scalable decoding apparatus of claim 6, wherein:

the decoded speech signal comprises a speech signal; and the interval detector detects an interval where a type of background noise contained in the speech signal changes as the allowing interval.

14. The scalable decoding apparatus of claim 6, wherein:

the decoded speech signal comprises a speech signal; and the interval detector detects an interval where a change in a spectrum of a speech signal is at or above a predetermined level as the allowing interval.

15. The scalable decoding apparatus of claim 6, wherein the interval detector detects an interval immediately after the core layer decoded speech signal has been interpolated, as the allowing interval.

16. A scalable decoding method that decodes enhancement layer encoded information comprising core layer encoded information and enhancement layer gain coefficients, comprising:

generating a core layer decoded speech signal, using a core layer decoder, by decoding core layer coded data;

calculating, via a current frame power calculator, a power of a current frame of the core layer decoded speech signal generated by the core layer decoder;

storing the current frame power calculated by the current frame power calculator by a number of essential frames;

detecting a change in power of the core layer decoded speech signal by comparing the calculated current frame power with a stored previous frame power;

variably setting a degree of attenuation according to a detected change in power so as to (i) set the degree of attenuation greater when a power decrease of the core layer decoded speech signal is detected than when a power increase of the core layer decoded speech signal is detected or (ii) set the degree of attenuation less when the power increase of the core layer decoded speech signal is detected than when the power decrease of the core layer decoded speech signal is detected; and attenuating enhancement layer gain coefficients for a second interval earlier than a first interval according to the set degree of attenuation and interpolating enhancement layer gain coefficients for the first interval, when enhancement layer encoded information of a first interval is lost.

* * * * *